(12) United States Patent
Morita et al.

(10) Patent No.: US 9,075,191 B2
(45) Date of Patent: Jul. 7, 2015

(54) OPTICAL WAVEGUIDE AND ARRAYED WAVEGUIDE GRATING

(75) Inventors: Keiichi Morita, Yokohama (JP); Kazumi Shimizu, Yokohama (JP); Koji Kawashima, Yokohama (JP)

(73) Assignee: NTT ELECTRONICS CORPORATION, Kanagawa (JP)

( * ) Notice: Subject to any disclaimer, the term of this patent is extended or adjusted under 35 U.S.C. 154(b) by 158 days.

(21) Appl. No.: 13/996,184

(22) PCT Filed: Sep. 26, 2011

(86) PCT No.: PCT/JP2011/071814
§ 371 (c)(1),
(2), (4) Date: Jun. 20, 2013

(87) PCT Pub. No.: WO2012/086281
PCT Pub. Date: Jun. 28, 2012

(65) Prior Publication Data
US 2013/0279854 A1 Oct. 24, 2013

(30) Foreign Application Priority Data
Dec. 22, 2010 (JP) ................................. 2010-286630

(51) Int. Cl.
G02B 6/12 (2006.01)
G02B 6/34 (2006.01)

(52) U.S. Cl.
CPC ........ *G02B 6/12014* (2013.01); *G02B 6/12011* (2013.01); *G02B 6/34* (2013.01)

(58) Field of Classification Search
None
See application file for complete search history.

(56) References Cited

U.S. PATENT DOCUMENTS

| 5,745,618 A | 4/1998 | Li |
| 6,787,868 B1 * | 9/2004 | McGreer et al. ............ 257/425 |
| 6,892,004 B1 | 5/2005 | Yu |
| 7,006,729 B2 | 2/2006 | Wang et al. |

(Continued)

FOREIGN PATENT DOCUMENTS

| CA | 2 409 118 A1 | 10/2002 |
| DE | 60222824 T2 | 7/2008 |

(Continued)

OTHER PUBLICATIONS

K. Maru et al. Low-loss arrayed-waveguide grating with high index regions at slab-to-array interfaces. Electronics Letters, 37:21:1287-1289, Oct. 11, 2001.*

(Continued)

*Primary Examiner* — Mike Stahl
(74) *Attorney, Agent, or Firm* — Ohlandt Greeley Ruggiero & Perle L.L.P.

(57) ABSTRACT

This optical waveguide is provided with a slab waveguide in which a grating is formed, an arrayed waveguide connected to a position where a constructive interference portion of a self-image of the grating is formed, and a refractive index change region which is formed between the slab waveguide and the arrayed waveguide, in which an average value of a refractive index in a refractive index distribution in a direction substantially vertical to a light propagation direction is averagely increased from the slab waveguide toward the arrayed waveguide, and in which an average value of the refractive index in a refractive index distribution in a direction substantially parallel to the light propagation direction is increased at a central axis of the arrayed waveguide.

18 Claims, 28 Drawing Sheets

(56) References Cited

U.S. PATENT DOCUMENTS

| | | | |
|---|---|---|---|
| 7,031,569 B2* | 4/2006 | Yamauchi et al. | 385/37 |
| 2002/0159696 A1 | 10/2002 | Yamauchi et al. | |
| 2003/0091265 A1* | 5/2003 | Lin et al. | 385/15 |
| 2003/0228104 A1* | 12/2003 | Tabuchi | 385/37 |
| 2006/0002657 A1* | 1/2006 | Hosoi | 385/37 |
| 2013/0058608 A1* | 3/2013 | Morita et al. | 385/37 |
| 2013/0209036 A1* | 8/2013 | Morita et al. | 385/37 |

FOREIGN PATENT DOCUMENTS

| | | | |
|---|---|---|---|
| EP | 1 253 449 A2 | 10/2002 | |
| JP | 2001-159718 | 12/2001 | |
| JP | 2003-14962 A | 1/2003 | |
| JP | 2006-030687 A | 2/2006 | |
| JP | 2008-293020 A | 12/2008 | |
| KR | 10-2000-0032760 A * | 6/2000 | G02B 6/12 |

OTHER PUBLICATIONS

International Search Report dated Oct. 25, 2011 for corresponding International Patent Application No. PCT/JP2011/071814 with English translation (2 pages).

Written Opinion of the International Searching Authority dated Oct. 25, 2011 corresponding to PCT/JP2011/071814, 7 pp.

International Preliminary Report on Patentability dated Jun. 25, 2013 corresponding to PCT/JP2011/071814, 8 pp.

* cited by examiner

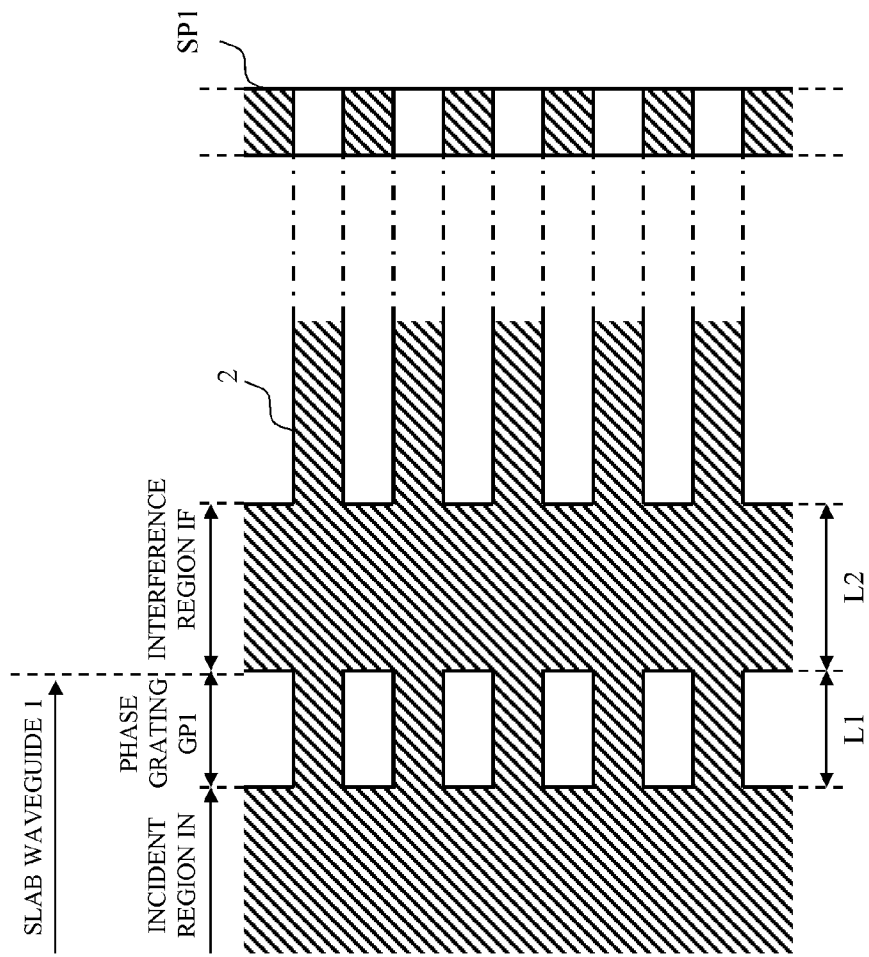

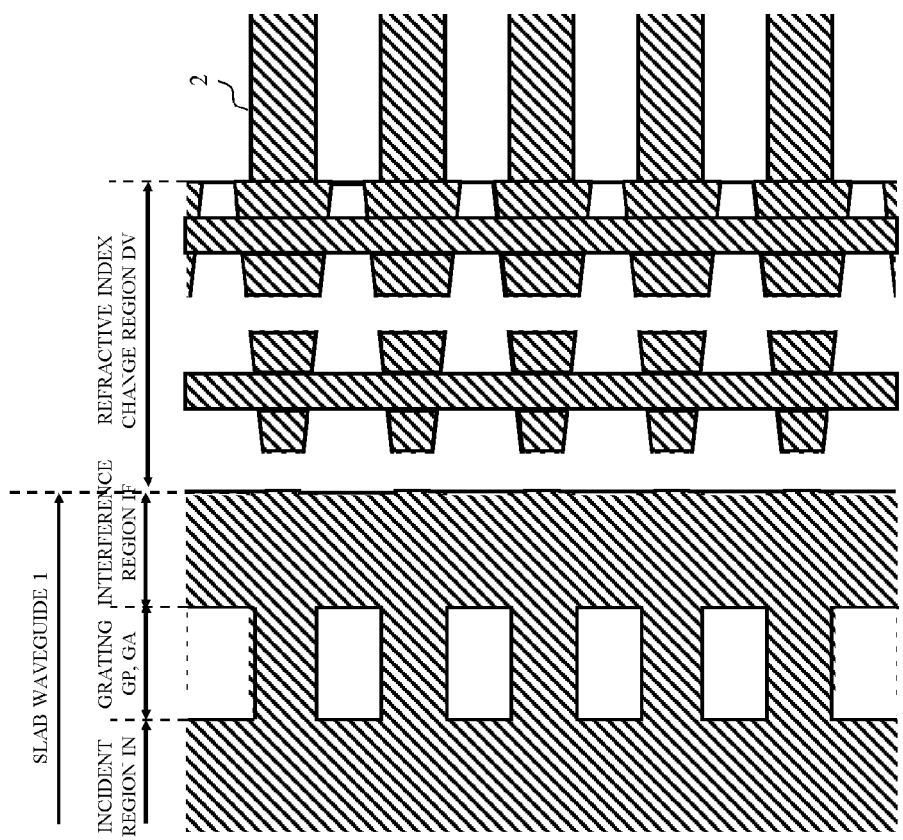

OPTICAL WAVEGUIDE AND ARRAYED WAVEGUIDE GRATING

BACKGROUND

1. Field of the Disclosure

The present disclosure relates to an optical waveguide and an arrayed waveguide grating, which can reduce insertion loss when light enters from a slab waveguide toward an arrayed waveguide or when the light enters from the arrayed waveguide toward the slab waveguide.

2. Discussion of the Background Art

In a DWDM (Dense Wavelength Division Multiplexing) multiplexer/demultiplexer, an M×N star coupler, a 1×N splitter, and so on, Patent Documents 1 to 6 disclose such a connection structure between a slab waveguide and an arrayed waveguide that when light enters from a slab waveguide toward an arrayed waveguide, the light does not radiate in a clad layer as a radiation mode between the arrayed waveguides adjacent to each other.

In the Patent Documents 1 to 4, a transition region where the refractive index of the waveguide gradually changes from the slab waveguide toward the arrayed waveguide is disposed. In the Patent Document 5, a slope portion is disposed between the slab waveguide and the arrayed waveguide. In the Patent Document 6, a core layer and a plurality of island-shaped regions are arranged in the slab waveguide. The refractive index of the island-shaped region is lower than the refractive index of the core layer. The island-shaped regions face a clad layer provided between the adjacent arrayed waveguides. The width of the island-shaped region in a direction substantially vertical to a light propagation direction becomes narrower from the slab waveguide toward the arrayed waveguide. Light passing through the core layer provided between the island-shaped regions adjacent to each other propagates toward the arrayed waveguide without changing the propagation direction. Light passing through the island-shaped region changes the propagation direction due to a tapered shape of the island-shaped region and propagates toward the arrayed waveguide. The tapered shape and the position of the island-shaped region are optimized, whereby the light is concentrated on the arrayed waveguide and propagates in the arrayed waveguide as a propagation mode.

Patent Document 1 U.S. Pat. No. 5,745,618
Patent Document 2 U.S. Pat. No. 7,006,729
Patent Document 3 U.S. Pat. No. 6,892,004
Patent Document 4 Japanese Patent Application Laid-Open No. 2008-293020
Patent Document 5 Japanese Patent Application Laid-Open No. 2001-159718
Patent Document 6 Japanese Patent Application Laid-Open No. 2003-14962

In the Patent Documents 1 to 4, since the transition region is disposed, the circuit size is increased. In the Patent Document 5, since the slope portion is disposed, circuit manufacturing is difficult. In the Patent Document 6, since the tapered shape and the position of the island-shaped region are required to be optimized, the circuit design is difficult.

Thus, in order to solve the above problems, the present disclosure provides an optical waveguide and an arrayed waveguide grating, which do not increase the circuit size, do not make difficult the circuit design and manufacturing, and can reduce insertion loss when light enters from a slab waveguide toward an arrayed waveguide or when the light enters from the arrayed waveguide toward the slab waveguide.

SUMMARY

In order to achieve the above object, a grating is formed in a slab waveguide, and an arrayed waveguide is connected to a position where a constructive interference portion of a self-image of the grating is formed. While the structure and position of the grating are optimized with respect to a specific design wavelength, they are not optimized with respect to other wavelengths. Thus, a refractive index change region is formed between the slab waveguide and the arrayed waveguide, and localizes light having other wavelengths in the arrayed waveguide.

Specifically, an optical waveguide according to the present disclosure includes: a slab waveguide in which a grating is formed; an arrayed waveguide connected to a position where a constructive interference portion of a self-image of the grating is formed; and a refractive index change region formed between the slab waveguide and the arrayed waveguide, in which an average value of the refractive index in a refractive index distribution in a direction substantially vertical to a light propagation direction is averagely increased from the slab waveguide toward the arrayed waveguide, and in which an average value of the refractive index in a refractive index distribution in a direction substantially parallel to the light propagation direction is increased at a central axis of the arrayed waveguide.

According to the above constitution, due to Talbot effect, the self-image of the grating is formed according to a wavelength of light and a period of the grating formed in the slab waveguide. An end of the arrayed waveguide is disposed at the position where the constructive interference portion of the self-image of the grating is formed, whereby when light enters from the slab waveguide toward the arrayed waveguide, the light is concentrated on the arrayed waveguide and propagates as a propagation mode. The size of an optical waveguide is not increased, the design and manufacturing is not made difficult, and insertion loss can be reduced when the light enters from the slab waveguide toward the arrayed waveguide or when the light enters from the arrayed waveguide toward the slab waveguide. When a refractive index change region is formed between the slab waveguide and the arrayed waveguide, light having wavelength other than a specific design wavelength in which the structure and position of the grating are optimized can be localized in the arrayed waveguide.

In the optical waveguide according to the present disclosure, the refractive index change region is formed in a portion between the slab waveguide and the arrayed waveguide.

According to the above constitution, the refractive index change region may be formed in a portion of a region where diffraction light interferes.

In the optical waveguide according to the present disclosure, the refractive index change region includes a high refractive index region which has a tapered shape in which the width in the direction substantially vertical to the light propagation direction is increased from the slab waveguide toward the arrayed waveguide, and in which the broader width side of the tapered shape faces the arrayed waveguide in the direction substantially parallel to the light propagation direction, and in which the narrower width side of the tapered shape faces the slab waveguide in the direction substantially parallel to the light propagation direction, and a low refractive index region which has a refractive index lower than that of the high refractive index region and has a tapered shape in which the width in the direction substantially vertical to the light propagation direction is reduced from the slab waveguide toward the arrayed waveguide, and in which the broader width side of the tapered shape faces the slab waveguide in the direction substantially parallel to the light propagation direction, and in which the narrower width side of the tapered shape faces the middle of the arrayed waveguides adjacent to each other in the direction substantially vertical to the light propagation direction, in the direction substantially parallel to the light propagation direction.

According to the above constitution, the refractive index change region can be easily formed.

In the optical waveguide according to the present disclosure, the low refractive index region is separated by a region having the same refractive index as the high refractive index region and extending in the direction substantially vertical to the light propagation direction, or the high refractive index region is separated by a region having the same refractive index as the low refractive index region and extending in the direction substantially vertical to the light propagation direction.

According to the above constitution, the refractive index change region can be easily formed.

In the optical waveguide according to the present disclosure, in the refractive index change region, a plurality of alternative arrangement regions in which a high refractive index region and a low refractive index region having a refractive index lower than that of the high refractive index region are alternatively arranged in the direction substantially vertical to the light propagation direction; and a plurality of vertically extending regions extending in the direction substantially vertical to the light propagation direction and having the same refractive index as the high refractive index region, are alternatively arranged in the direction substantially parallel to the light propagation direction, and the alternative arrangement region closer to the arrayed waveguide side of the plurality of alternative arrangement regions has a narrower width in the direction substantially parallel to the light propagation direction, or the vertically extending region closer to the arrayed waveguide side of the plurality of vertically extending regions has a broader width in the direction substantially parallel to the light propagation direction.

According to the above constitution, the refractive index change region can be easily formed.

In the optical waveguide according to the present disclosure, the low refractive index region constitutes two parallel divided regions divided in the direction substantially parallel to the light propagation direction, the two parallel divided regions are arranged at a distance from each other in the direction substantially vertical to the light propagation direction, and a parallel inter-divisional region having the same refractive index as the high refractive index region is disposed between the two parallel divided regions.

According to the above constitution, the refractive index change region can be easily formed.

In the optical waveguide according to the present disclosure, the grating is a phase grating.

According to the above constitution, when a phase difference is given to incident light, the incident light is diffracted, and therefore, loss of the incident light can be reduced.

In the optical waveguide according to the present disclosure, a phase difference given to incident light by the phase grating is approximately 90 degrees.

According to the above constitution, a self-image of the phase grating is clearly formed.

In the optical waveguide according to the present disclosure, a phase difference given to incident light by the phase grating is approximately 180 degrees.

According to the above constitution, the self-image of the phase grating is clearly formed.

An arrayed waveguide grating according to the present disclosure includes: one or more first input/output waveguides; the optical waveguide whose end of the slab waveguide on the opposite side of the arrayed waveguide is connected to an end of the first input/output waveguide; a second slab waveguide connected to an end of the arrayed waveguide on the opposite side of the slab waveguide; and one or more second input/output waveguides connected to an end of the second slab waveguide on the opposite side of the arrayed waveguide.

According to the above constitution, the size of the arrayed waveguide grating is not increased, the design and manufacturing is not made difficult, and the insertion loss can be reduced when light enters from the slab waveguide toward the arrayed waveguide or when the light enters from the arrayed waveguide toward the slab waveguide. When the refractive index change region is formed between the slab waveguide and the arrayed waveguide, light having a wavelength other than a specific design wavelength in which the structure and position of the grating are optimized can be localized in the arrayed waveguide.

The present disclosure can provide an optical waveguide and an arrayed waveguide grating, which do not increase the circuit size, do not make difficult the circuit design and manufacturing, and can reduce insertion loss when light enters from a slab waveguide toward an arrayed waveguide or when the light enters from the arrayed waveguide toward the slab waveguide. The light having a wavelength other than a specific design wavelength in which the structure and position of the grating are optimized can be localized in the arrayed waveguide.

BRIEF DESCRIPTION OF THE DRAWINGS

FIGS. 6A, 6B and 6C are views showing a relationship between a phase grating of a slab waveguide and an incident end of an arrayed waveguide.

FIGS. 9A, 9B, 9C and 9D are views showing various examples of a structure of the refractive index change region.

DETAILED DESCRIPTION OF THE PREFERRED EMBODIMENT

Figure 1:
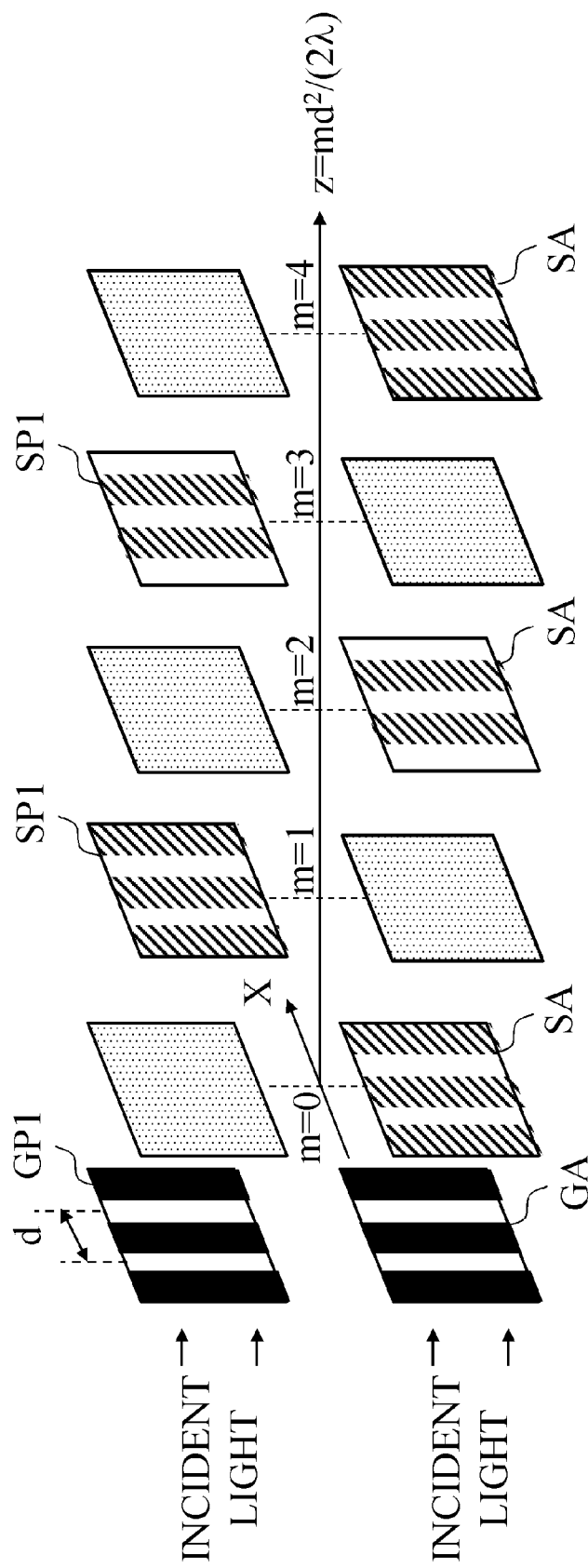
FIG. 1 is a view showing a phenomenon of Talbot effect.

Embodiments of the present disclosure will be described with reference to the accompanying drawings. The embodiments to be described hereinafter are examples of the present disclosure, and the present disclosure is not limited to the following embodiments. Components denoted by the same reference numerals in the present specification and the drawings mutually denote the same components.

Embodiment 1

In an embodiment 1, first, a phenomenon and calculation results of Talbot effect will be described. Next, an optical waveguide which can reduce insertion loss when light enters from a slab waveguide toward an arrayed waveguide, or when the light enters from the arrayed waveguide toward the slab waveguide will be described based on the phenomenon and the calculation results of the Talbot effect.

The Talbot effect means that when light enters a grating, diffracted lights interfere with each other, whereby a light intensity distribution similar to a pattern of the grating is realized as a self-image of the grating at a position apart from the grating with a distance specified according to the wavelength of the light and a period of the grating, and the Talbot effect is applied to a Talbot interferometer.

Figure 2:
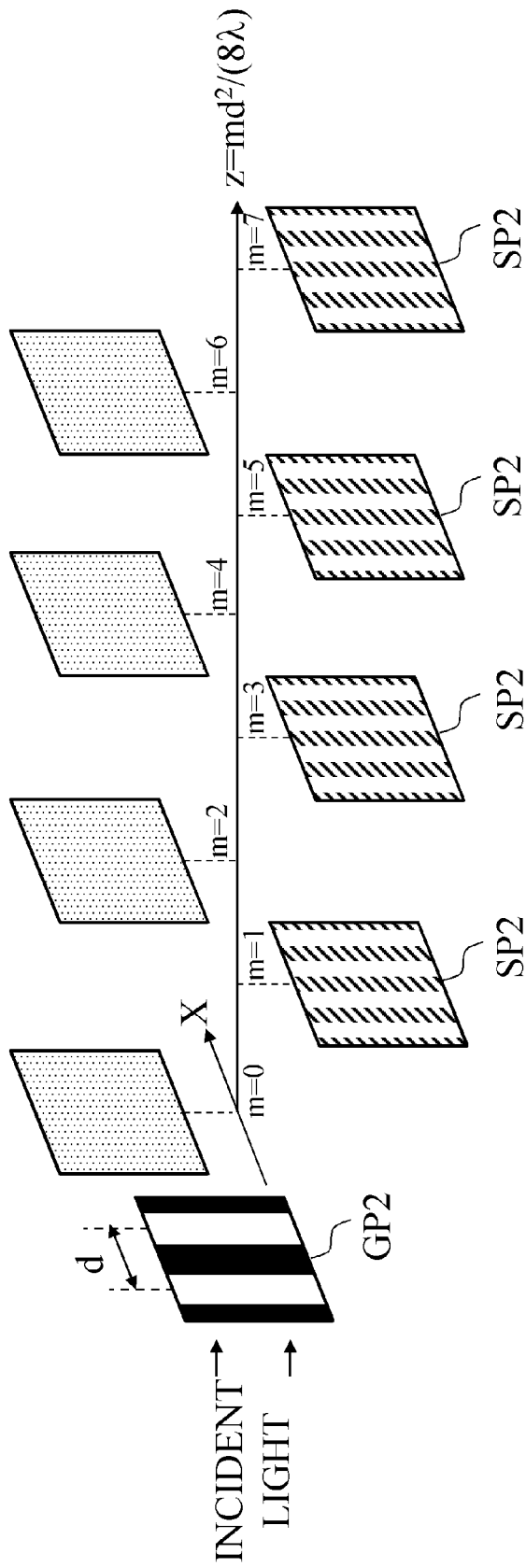
FIG. 2 is a view showing the phenomenon of the Talbot effect.

FIGS. 1 and 2 are views showing a phenomenon of Talbot effect. Gratings GP1 and GP2 are phase gratings giving a phase difference to incident light. A grating GA is an amplitude grating giving an intensity difference to the incident light. The phenomenon of the Talbot effect associated with the phase grating GP1 is shown in an upper half of FIG. 1, the phenomenon of the Talbot effect associated with the amplitude grating GA is shown in a lower half of FIG. 1, and the phenomenon of the Talbot effect associated with the phase grating GP2 is shown in FIG. 2. Each period of the phase gratings GP1 and GP2 and the amplitude grating GA is d. The phase difference given to the incident light by the phase grating GP1 is 90°, and the phase difference given to the incident light by the phase grating GP2 is 180°. The phase gratings GP1 and GP2 and the amplitude grating GA are arranged at a position of z=0 in an x-y plane (y axis is not shown in FIGS. 1 and 2) (in FIGS. 1 and 2, as a matter of convenience, the phase gratings GP1 and GP2 and the amplitude grating GA are shown on the left side of the drawing relative to the position of z=0). The wavelength of the incident light is $\lambda$. The incident light enters as parallel light in the z-axis direction as shown by arrows at the left ends of FIGS. 1 and 2.

First, the phenomenon of the Talbot effect associated with the phase grating GP1 will be described. When $z=md^2/(2\lambda)$, a light intensity distribution formed immediately after the phase grating GP1 is uniform at the position of m=0 as shown by a sand portion, and light intensity distributions similar to this light intensity distribution are shown at positions of m=2, 4, 6, 8, ..., 4n+2, 4n+4, ... (n is an integer of not less than 0). Meanwhile, at positions of m=1, 3, 5, 7, ..., 4n+1, 4n+3, ..., self-images SP1 of the phase grating GP1 are clearly formed as shown by diagonal lines and white portions. Although the self-images SP1 of the phase grating GP1 are formed at positions other than the positions of m=1, 3, 5, 7, ..., 4n+1, 4n+3, ..., the self-images SP1 are not clearly formed, and a boundary between a constructive interference portion and a destructive interference portion is not clear. The intensity period of the self-image SP1 of the phase grating GP1 is d.

The self-images SP1 of the phase grating GP1 formed at the positions of m=1, 5, ..., 4n+1, ... are shifted by d/2 in the x-axis direction in comparison with the self-images SP1 of the phase grating GP1 formed at the positions of m=3, 7, ..., 4n+3, ....

Next, the phenomenon of the Talbot effect associated with the amplitude grating GA will be described. When $z=md^2/(2\lambda)$, the light intensity distribution formed immediately after the amplitude grating GA is shown at the position of m=0, and light intensity distributions similar to this light intensity distribution are shown as self-images SA of the amplitude grating GA at the positions of m=2 and 4. Although the self-images SA of the amplitude grating GA are clearly formed at the position of m=2, 4, 6, 8, ..., 4n+2, 4n+4, ... (n is an integer of not less than 0) as shown by diagonal lines and white portions, the self-images SA of the amplitude grating GA are not formed at the positions of m=1, 3, 5, 7, ..., 4n+1, 4n+3, ... as shown by a sand portion, and a uniform intensity distribution exists. Although the self-images SA of the amplitude grating GA are formed at positions other than the positions of m=2, 4, 6, 8, ..., 4n+2, 4n+4, ..., the self-images SA are not clearly formed, and the boundary between the constructive interference portion and the destructive interference portion is not clear. The intensity period of the self-image SA of the amplitude grating GA is d.

The self-images SA of the amplitude grating GA formed at the positions of m=2, 6, ..., 4n+2, ... are shifted by d/2 in the x-axis direction in comparison with the self-images SA of the amplitude grating GA formed at the positions of m=4, 8, ..., 4n+4, ....

Next, the phenomenon of the Talbot effect associated with the phase grating GP2 will be described. When $z=md^2/(8\lambda)$, the light intensity distribution formed immediately after the phase grating GP2 is uniform at the position of m=0 as shown by a sand portion, and light intensity distributions similar to this light intensity distribution are shown at the positions of m=2, 4, 6, ..., 2n, ... (n is an integer of not less than 0). Meanwhile, at the positions of m=1, 3, 5, 7, ..., 2n+1, ..., self-images SP2 of the phase grating GP2 are clearly formed as shown by diagonal lines and white portions. Although the self-images SP2 of the phase grating GP2 are formed at positions other than the positions of m=1, 3, 5, 7, ..., 2n+1, ..., the self-images SP2 are not clearly formed, and the boundary between the constructive interference portion and the destructive interference portion is not clear. The intensity period of the self-image SP2 of the phase grating GP2 is d/2. The self-image SP2 does not shift for each order.

The phase gratings GP1 and GP2 change the speed of light according to the position of the x coordinate and give a phase difference to incident light. The amplitude grating GA changes absorption of light according to the position of the x coordinate and gives an intensity difference to the incident light. Accordingly, when the optical waveguide according to the present disclosure is applied to, for example, an arrayed waveguide grating described in an embodiment 5, the phase gratings GP1 and GP2 are preferably used in order to reduce loss of light. Thus, in the following description, the case of using the phase gratings GP1 and GP2 will be described in detail, and in the case of using the amplitude grating GA, portions different from the case of using the phase gratings GP1 and GP2 will be briefly described.

Figure 3:
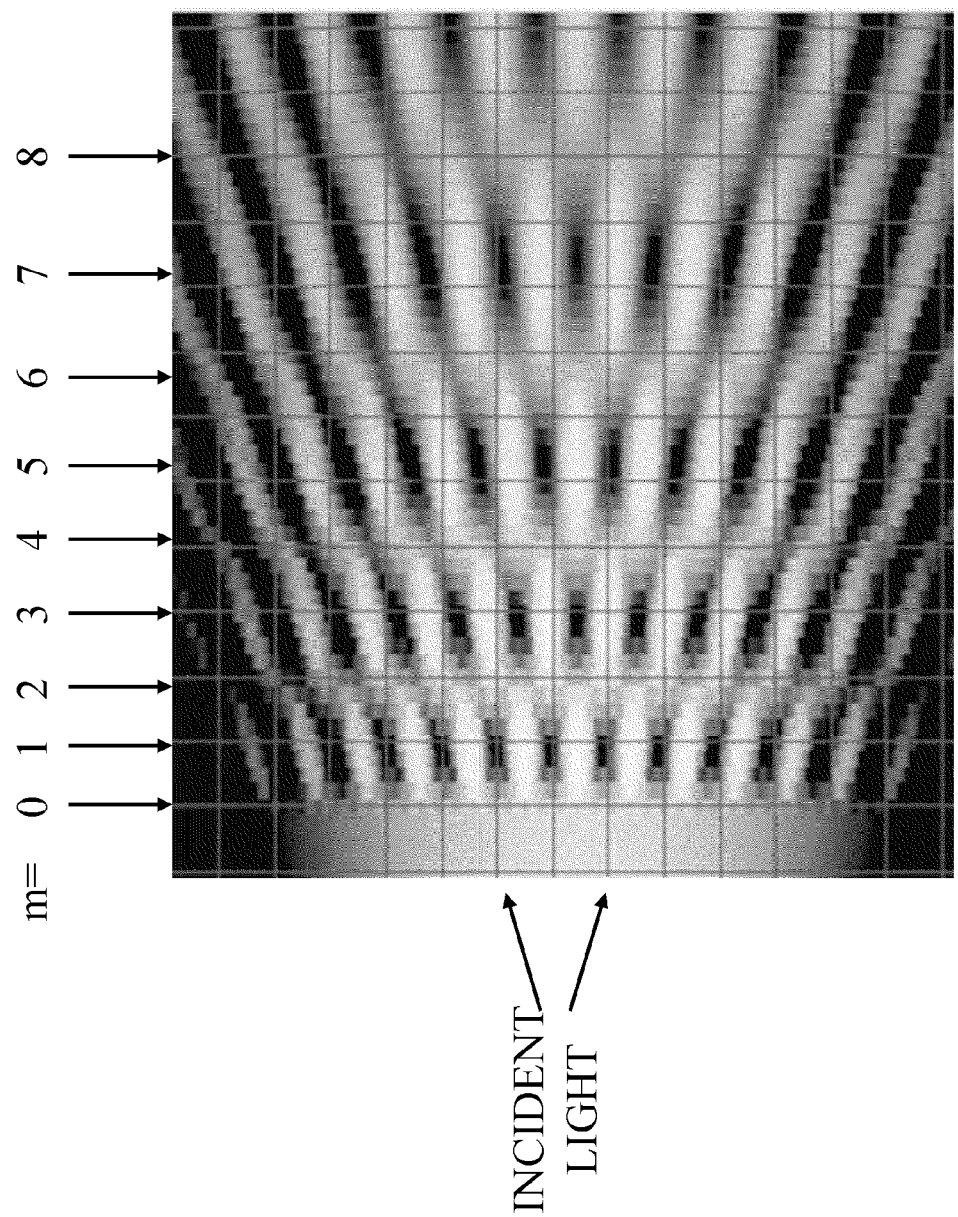
FIG. 3 is a view showing calculation results of the Talbot effect.
Figure 4:
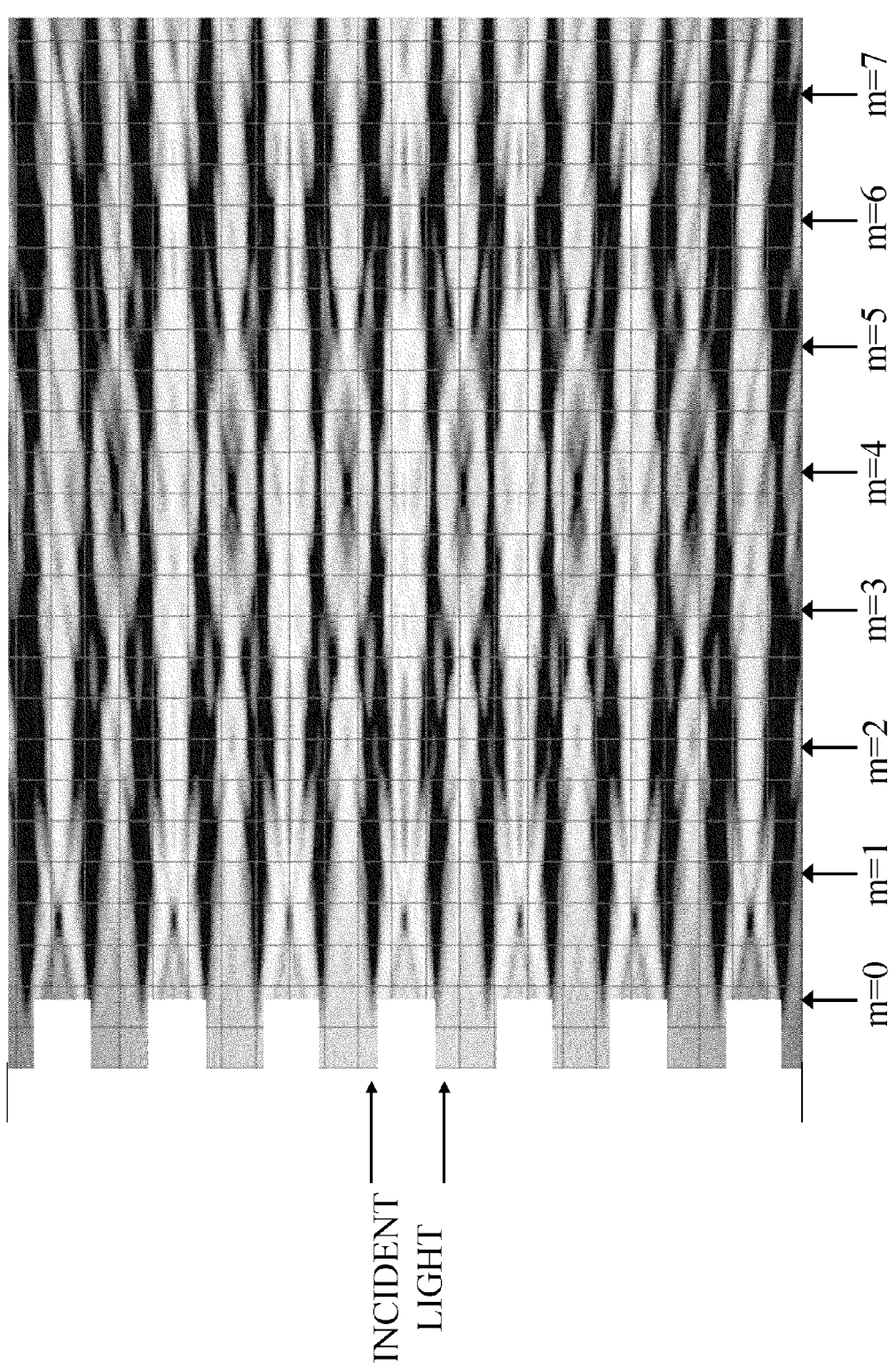
FIG. 4 is a view showing the calculation results of the Talbot effect.
Figure 5A:
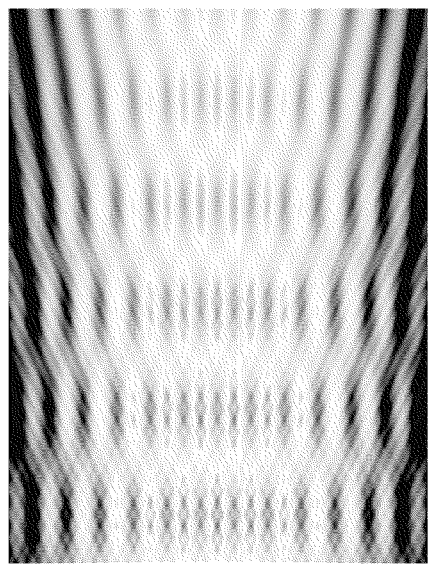
FIGS. 5A, 5B, 5C, 5D, 5E, 5F, 5G, 5H and 5I are views showing the calculation results of the Talbot effect.
Figure 5B:
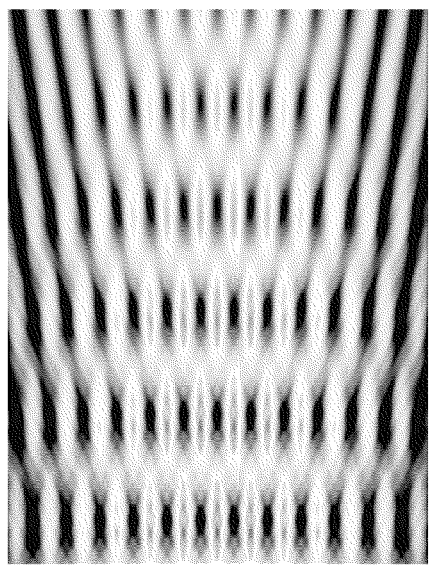
Figure 5C:
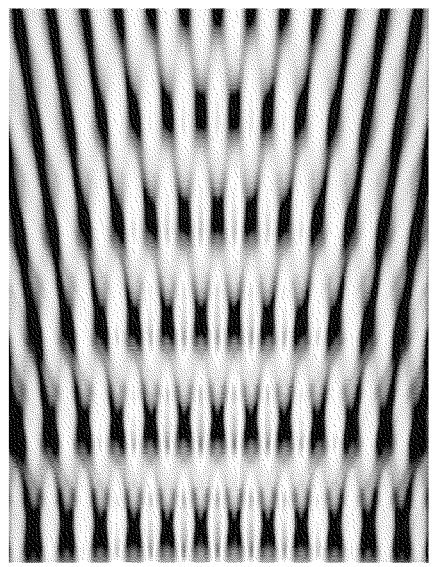
Figure 5D:
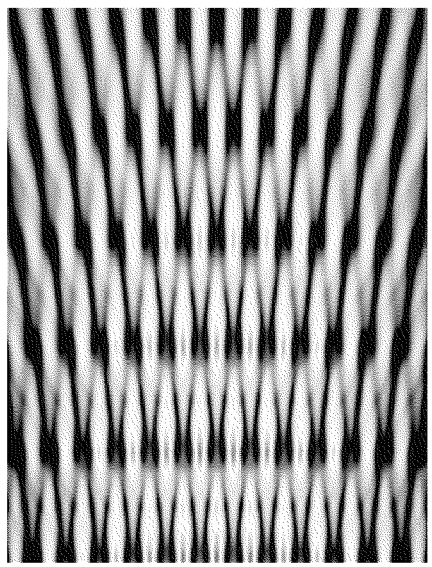
Figure 5E:
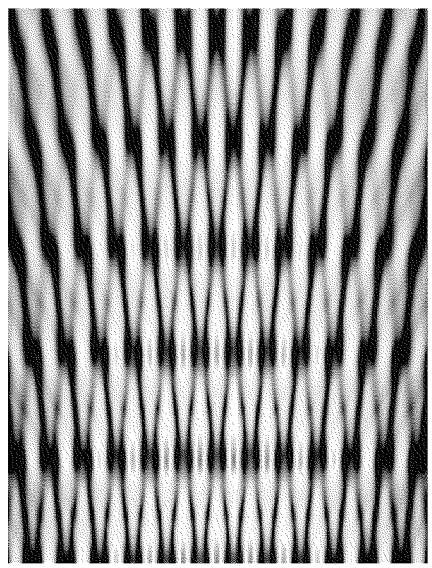
Figure 5F:
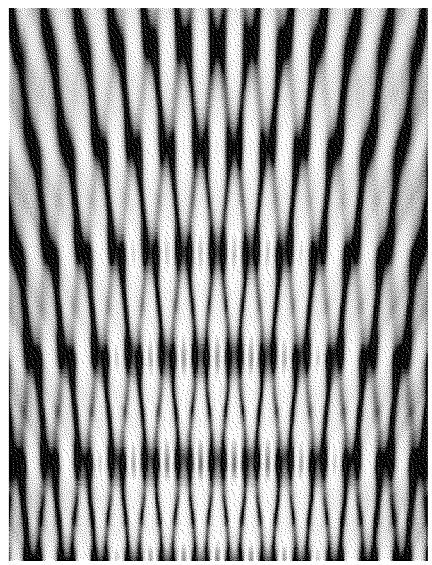
Figure 5G:
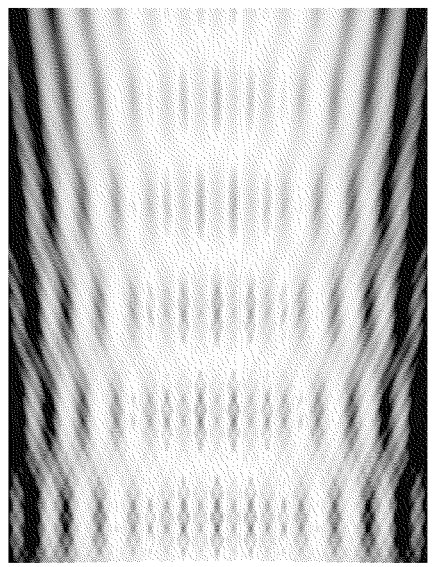
Figure 5H:
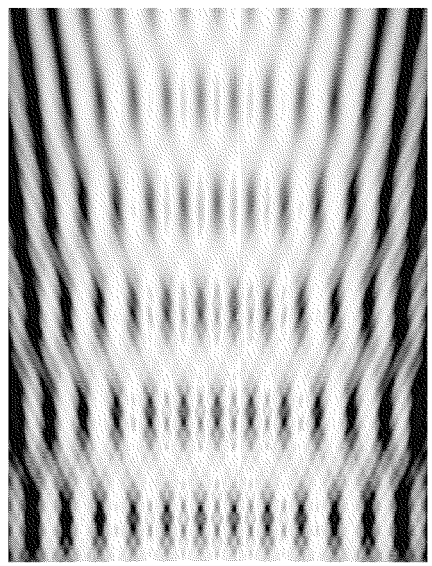
Figure 5I:
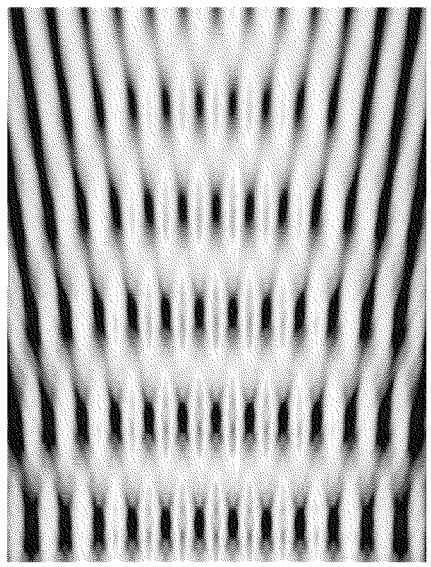

FIG. 3 is a view showing calculation results of the Talbot effect of the phase grating GP1. In FIG. 1, although incident light is parallel light, in FIG. 3 the incident light is diffusion light in consideration that the light propagating in the slab waveguide is not parallel light but diffusion light. The incident light enters as diffusion light toward the right direction as shown by arrows at the left end of FIG. 3. FIG. 4 is a view showing calculation results of the Talbot effect of the phase grating GP2. In FIG. 4, incident light is parallel light. The incident light enters as parallel light toward the right direction as shown by arrows at the left end of FIG. 4. In FIGS. 3 and 4, the phase gratings GP1 and GP2 are arranged at the position of m=0.

Although the self-images SP1 of the phase grating GP1 are clearly formed at the positions of m=1, 3, 5, 7, ..., 4n+1, 4n+3, ... as shown by a clear black and white gradation, the self-images SP1 are not clearly formed at the positions of m=2, 4, 6, 8, ..., 4n+2, 4n+4, ... as shown by an unclear black and white gradation. At positions other than the positions of m=1, 3, 5, 7, ..., 4n+1, 4n+3, ..., the closer to the positions of m=1, 3, 5, 7, ..., 4n+1, 4n+3, ..., the more clearly the self-image SP1 of the phase grating GP1 are formed, and the closer to the positions of m=2, 4, 6, 8, ..., 4n+2, 4n+4, ..., the less clearly the self-image SP1 of the phase grating GP1 is formed. The positions of m=0, 1, 2, 3, ... are not arranged at regular intervals because the incident light is not parallel light but diffusion light.

When FIG. 3 is seen as a whole, the black and white gradation is spread in the vertical direction of FIG. 3 as it progresses toward the right direction. When FIG. 3 is seen in detail, the black and white gradation drastically changes near the positions of m=2, 4, 6, 8, ..., 4n+2, 4n+4, .... This phenomenon corresponds to the fact that in FIG. 1, the self-images SP1 of the phase grating GP1 formed at the positions of m=1, 5, ..., 4n+1, ... are shifted by d/2 in the x-axis direction in comparison with the self-images SP1 of the phase grating GP1 formed at the positions of m=3, 7, ..., 4n+3, .... The self-images SP1 of the phase grating GP1 formed at the positions of m=1, 3, 5, 7, ..., 4n+1, 4n+3, ... are more clearly formed as m becomes smaller. Although the calculation results of FIG. 4 and a schematic drawing in FIG. 2 show similar tendencies, in FIG. 4 a peak having the same period as the period of the phase grating GP2 is confirmed at the positions of m=2, 4, .... This is because while the simulation in FIG. 4 is calculation based on a general optical circuit, when the phase grating GP2 is formed of a material having a low refractive index difference such as a core material and a clad material, the phase grating GP2 is elongated in the light propagation direction, light propagating in a portion having a low refractive index couples to a portion having a high refractive index as the propagation distance becomes longer, and the intensity distribution occurs at a tail end of the phase grating GP2.

FIGS. 5A, 5B, 5C, 5D, 5E, 5F, 5G, 5H and 5I are views showing the calculation results of the Talbot effect of the phase grating GP giving various phase differences to incident light. In FIGS. 5A, 5B, 5C, 5D, 5E, 5F, 5G, 5H, and 5I, the phase differences given to the incident light by the phase grating GP are π/8, π/4, π/2, 3π/4, 7π/8, π, π/12, π/6, and π/3, respectively. In FIGS. 5A, 5B, 5C, 5D, 5E, 5F, 5G, 5H and 5I, the incident light is parallel light, and the phase grating GP is disposed at the left end of each drawing. As long as the self-image SP of the phase grating GP can be clearly formed by the Talbot effect, the phase difference given to the incident light by the phase grating GP may be a phase difference other than the above phase differences in FIGS. 5A, 5B, 5C, 5D, 5E, 5F, 5G, 5H and 5I.

Figure 6B:
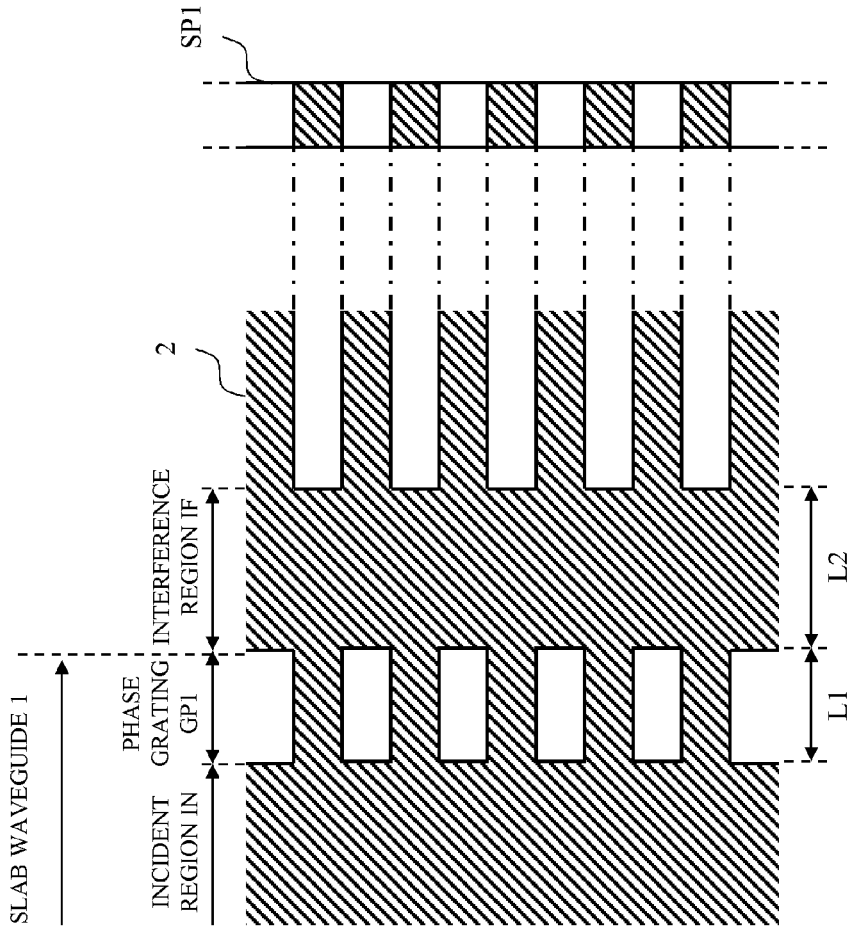
Figure 6C:
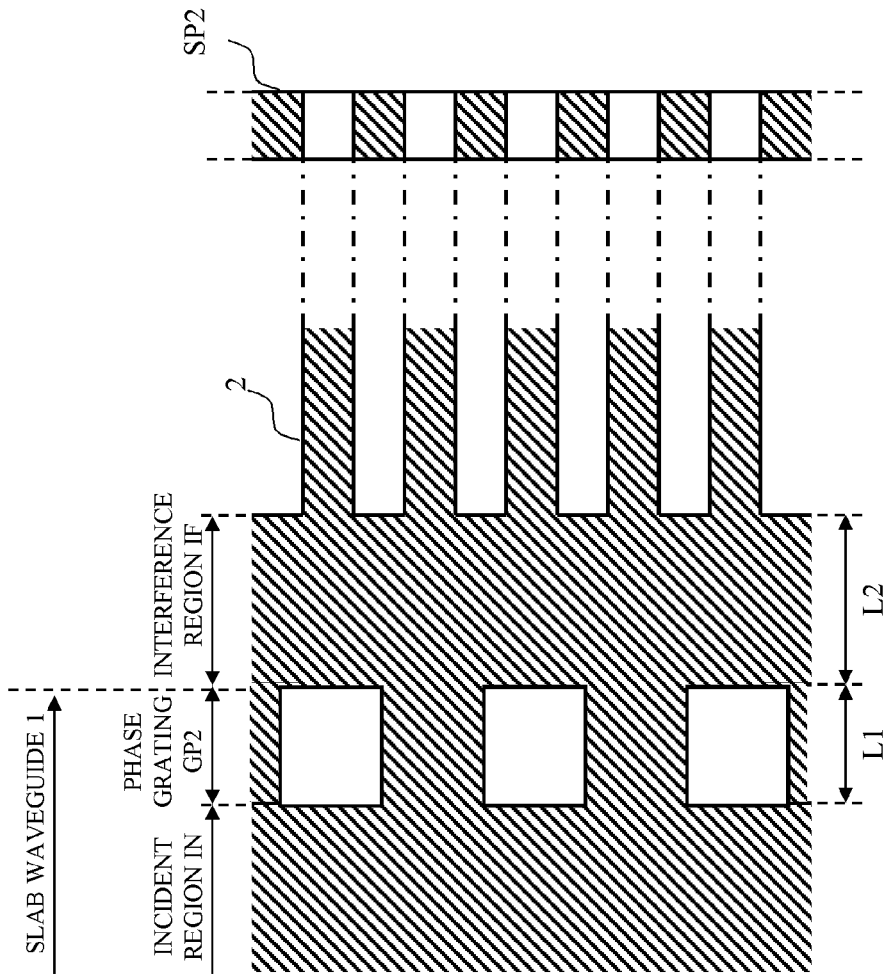

Next, the optical waveguide, which can reduce the insertion loss when light enters from the slab waveguide toward the arrayed waveguide, or when the light enters from the arrayed waveguide toward the slab waveguide, will be described based on the phenomenon and the calculation results of the Talbot effect. FIGS. 6A, 6B and 6C are views showing a relationship between the phase grating GP1 or GP2 of a slab waveguide 1 and an end of an arrayed waveguide 2. The respective left sides of FIGS. 6A to 6C show the overall configuration of the optical waveguide. The respective right sides of FIGS. 6A and 6B show the self-image SP1 of the phase grating GP1. The right side of FIG. 6C shows the self-image SP2 of the phase grating GP2. In each of FIGS. 6A to 6C, the left and right side views are positionally aligned in the vertical direction of FIGS. 6A, 6B and 6C by alternate long and short dashed lines. In FIGS. 6A and 6B, the positional relationship between the phase grating GP1 of the slab waveguide 1 and the end of the arrayed waveguide 2 is different from each other.

The optical waveguide is constituted of the slab waveguide 1, the arrayed waveguide 2, and the interference region IF. The slab waveguide 1 is constituted of an incident region IN and the phase grating GP1 or GP2. The incident region IN is disposed on the incident side of the slab waveguide 1, and incident light propagates in the incident region IN. The phase grating GP1 or GP2 is disposed between the incident region IN and the interference region IF and formed from a region shown by diagonal lines and a region shown by a white portion, which have different refractive indices. The refractive index of the region shown by diagonal lines may be higher or lower than the refractive index of the region shown by a white portion. Incident light propagates in the region with a high refractive index at low speed and propagates in the region with a low refractive index at high speed. The phase grating GP1 or GP2 changes the speed of light according to the position in the vertical direction of FIGS. 6A, 6B and 6C and gives a phase difference to the incident light. The interference region IF is disposed between the slab waveguide 1 and the arrayed waveguide 2, and diffraction light is propagated in the interference region IF.

The arrayed waveguide 2 is connected to the interference region IF at a constructive interference portion shown by a white portion of the self-image SP1 of the phase grating GP1 or the self-image SP2 of the phase grating GP2. Namely, since the diffraction light is concentrically distributed in the constructive interference portion shown by a white portion of the self-image SP1 of the phase grating GP1 or the self-image SP2 of the phase grating GP2, the diffraction light propagates in the arrayed waveguide 2 as a propagation mode. Since the diffraction light is less distributed in a destructive interference portion shown by diagonal lines of the self-image SP1 of the phase grating GP1 or the self-image SP2 of the phase grating GP2, the diffraction light does not radiate in the clad layer as a radiation mode. In FIGS. 6A, 6B and 6C, a plurality of the arrayed waveguides 2 are connected; however, only one waveguide may be connected.

In FIG. 6A, the constructive interference portion shown by the white portion of the self-image SP1 of the phase grating GP1 is formed at the position corresponding to the region shown by the diagonal lines of the phase grating GP1, and the end of the arrayed waveguide 2 is connected to the constructive interference portion. In FIG. 6B, the constructive interference portion shown by the white portion of the self-image SP1 of the phase grating GP1 is formed at the position corresponding to the region shown by the white portion of the phase grating GP1, and the end of the arrayed waveguide 2 is connected to the constructive interference portion. The different positional relationships thus exist as the positional relationship between the phase grating GP1 of the slab waveguide 1 and the end of the arrayed waveguide 2, and this phenomenon corresponds to the fact that as shown in FIG. 1, the self-images SP1 of the phase grating GP1 formed at the positions of m=1, 5, ..., 4n+1, ... are shifted by d/2 in the x-axis direction in comparison with the self-images SP1 of the phase grating GP1 formed at the positions of m=3, 7, ..., 4n+3, .... In FIG. 6C, the constructive interference portion shown by the white portion of the self-image SP2 of the phase grating GP2 is formed at a position advanced in a direction substantially parallel to the light propagation direction from the regions shown by the diagonal lines and the white portion of the phase grating GP2, and the end of the arrayed waveguide 2 is connected to the constructive interference portion. Although the period of the phase grating GP1 is the same as the period of the arrayed waveguide 2 in FIGS. 6A and 6B, the period of the phase grating GP2 is twice the period of the arrayed waveguide 2 in FIG. 6C.

As described above, due to the Talbot effect, the self-image SP1, SP2, or SA of the grating GP1, GP2, or GA is formed according to the wavelength λ of the incident light and the period of the grating GP1, GP2 or GA. The end of the arrayed waveguide 2 is disposed at the position where the constructive interference portion of the self-image SP1, SP2, or SA of the grating GP1, GP2 or GA is formed, whereby when light enters from the slab waveguide 1 toward the arrayed waveguide 2, the light is concentrated on the arrayed waveguide 2 and propagates as a propagation mode. Accordingly, when the light enters from the slab waveguide 1 to the arrayed waveguide 2, the insertion loss can be reduced. Due to reciprocity of light, this also applies to the case where the light enters from the arrayed waveguide 2 toward the slab waveguide 1. When the arrayed waveguide 2 is branched near a boundary between the arrayed waveguide 2 and the interference region IF, each end of the branched arrayed waveguides 2 is disposed at the position where the constructive interference portion is formed.

Embodiment 2

In an embodiment 2, a method of designing an optical waveguide will be described. First, a method of setting a light propagation direction width L1 of phase gratings GP1 and GP2 will be described. Next, a method of setting a light propagation direction width L2 of an interference region IF will be described. Finally, a method of setting a position of an end of an arrayed waveguide 2 will be described.

In order to clearly form a self-image SP1 of the phase grating GP1 at the end of the arrayed waveguide 2, the light propagation direction width L1 of the phase grating GP1 is set so that a phase difference given to light by the phase grating GP1 is preferably 80° to 100°, more preferably 90°. In order to clearly form a self-image SP2 of the phase grating GP2 at the end of the arrayed waveguide 2, the light propagation direction width L1 of the phase grating GP2 is set so that a phase difference given to light by the phase grating GP2 is preferably 170° to 190°, more preferably 180°.

Wavelength in vacuum of light is represented by λ, a refractive index of a region having a high refractive index is represented by n, the refractive index of a region having a low refractive index is represented by n−δn, and a relative refractive index difference between the region having a high refractive index and the region having a low refractive index is represented by $\Delta=\delta n/n$. A phase lead angle at the time when light passes from a start end to a terminal end of the region having a high refractive index is $L1\div(\lambda/n)\times 2\pi=2\pi nL1/\lambda$. The phase lead angle at the time when light passes from a start end to a terminal end of the region having a low refractive index is $L1\div(\lambda/(n-\delta n))\times 2\pi=2\pi(n-\delta n)L1/\lambda$. The phase difference given to light by the phase grating GP is $2\pi nL1/\lambda-2\pi(n-\delta n)L1/\lambda=2\pi\delta nL1/\lambda=2\pi n\Delta L1/\lambda$. L1 is preferably set to be $\lambda/(4n\Delta)$ so that the phase difference given to light by the phase grating GP1 is 90°. For example, when λ=1.55 µm, n=1.45, and Δ=0.75%, L1 is preferably set to be about 35 µm so that the phase difference given to light by the phase grating GP1 is 90°. L1 is preferably set to be $\lambda/(2n\Delta)$ so that the phase difference given to light by the phase grating GP2 is 180°. For example, when λ=1.55 µm, n=1.45, and Δ=0.75%, L1 is preferably set to be about 70 µm so that the phase difference given to light by the phase grating GP2 is 180°.

In order to clearly form the self-image SP of the phase grating GP at the end of the arrayed waveguide 2, the light propagation direction width L2 of the interference region IF is set based on the description of FIGS. 1 to 4.

When the wavelength in vacuum of light is represented by λ, and the refractive index of the interference region IF is represented by n equal to the refractive index of the region with a high refractive index, the wavelength in the interference region IF of light is λ/n. Based on the description of FIG. 1, L2 is set as optimum design to be $md^2/(2(\lambda/n))$ with respect to the phase grating GP1. For example, when d=10.0 µm, λ=1.55 µm, and n=1.45, L2 is set as optimum design to be about 47 µm when m=1. Based on the description of FIG. 2, L2 is set as optimum design to be $md^2/(8(\lambda/n))$ with respect to the phase grating GP2. For example, when d=20.0 µm, λ=1.55 µm, and n=1.45, L2 is set as optimum design to be about 47 µm when m=1. Based on the description of FIG. 3, the calculation result of the Talbot effect is obtained, further considering the degree of diffusion of light, and L2 is set as the optimum design.

Figure 7:
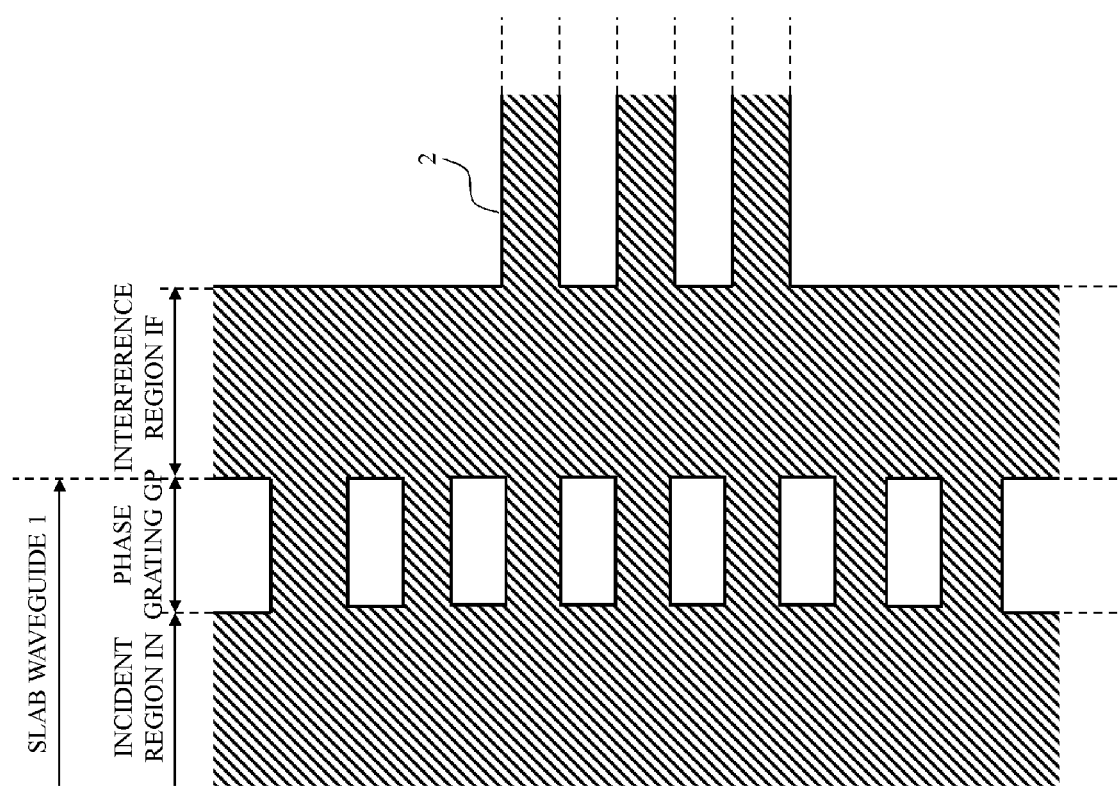
FIG. 7 is view showing a relationship between the phase grating of the slab waveguide and the incident end of the arrayed waveguide.

After the light propagation direction width L2 of the interference region IF is set based on the description of FIGS. 1 to 4, a constructive interference portion of the self-image SP of the phase grating GP at the terminal end of the interference region IF is set as the position of the end of the arrayed waveguide 2 based on the description of FIGS. 1 to 4. It is preferable that among the ends of the plurality of arrayed waveguides 2, the self-image SP of the phase grating GP is clearly formed at not only the end of the center arrayed waveguide 2 but also the ends of the arrayed waveguides 2 at the both edges of the plurality of arrayed waveguides 2. Thus, the positional relationship between the phase grating GP of the slab waveguide 1 and the end of the arrayed waveguide 2 is preferably the positional relationship shown in FIG. 7. Namely, it is preferable that the number of the regions of the phase grating GP having a high refractive index is larger than the number of the arrayed waveguides 2.

In order to reduce the size of the optical waveguide, and in order to clearly form the self-image SP or SA of the grating GP or GA, it is preferable that m is reduced and the light propagation direction width L2 of the interference region IF is reduced. The grating GP or GA may have any shape as long as it has a function of diffracting light. As in the above description, this disclosure does not increase the size of the optical waveguide and does not make the design difficult. When this disclosure is not employed, the propagation loss between the slab waveguide 1 and the arrayed waveguide 2 is approximately 0.45 dB; however, when this disclosure is employed in the above designing method, the propagation loss can be reduced to not more than 0.1 dB.

Embodiment 3

In the embodiment 3, the effect and structure of the refractive index change region will be described. In optical waveguides shown in FIGS. 6A, 6B, 6C and 7, although the structure and position of the gratings GP or GA are optimized with respect to a specific design wavelength, they are not optimized with respect to other wavelengths. Accordingly, loss depends on the wavelength. Thus, in order to reduce the wavelength dependence of loss, in optical waveguides shown in FIGS. 8A, 8B, 9A, 9B, 9C, 9D, 10A and 10B, a refractive index change region DV is formed between a slab waveguide 1 and an arrayed waveguide 2.

Figure 8A:
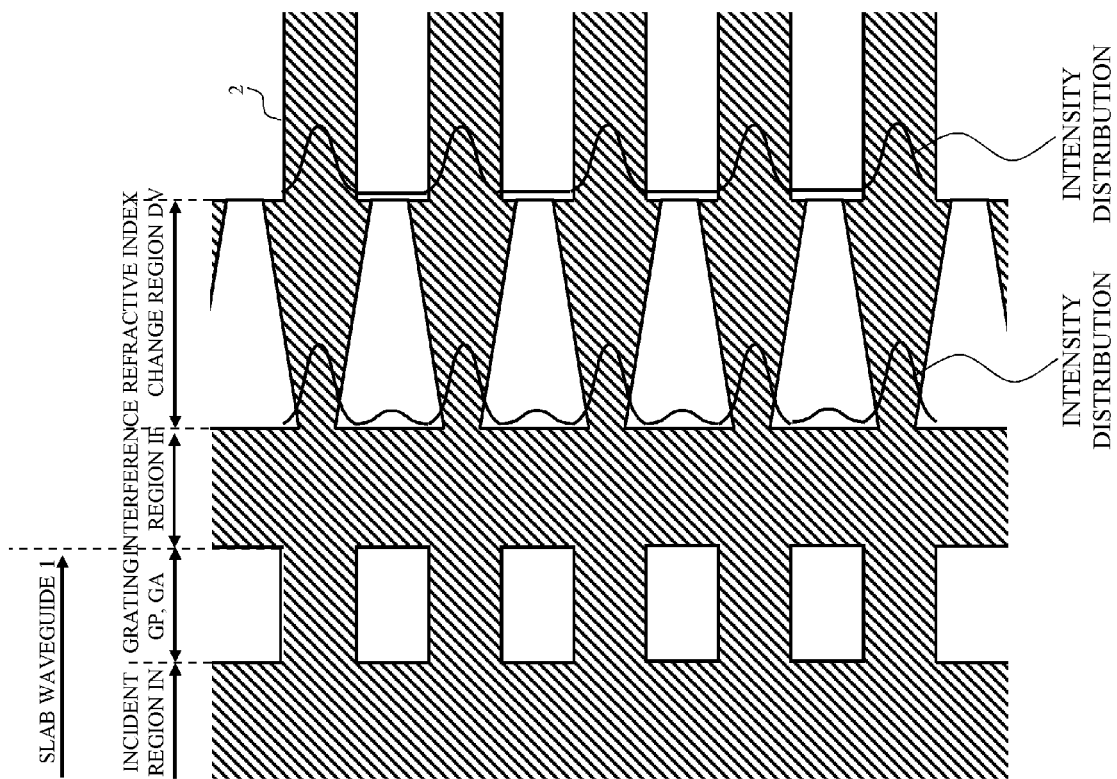
FIGS. 8A and 8B are views showing an effect of a refractive index change region.
Figure 8B:
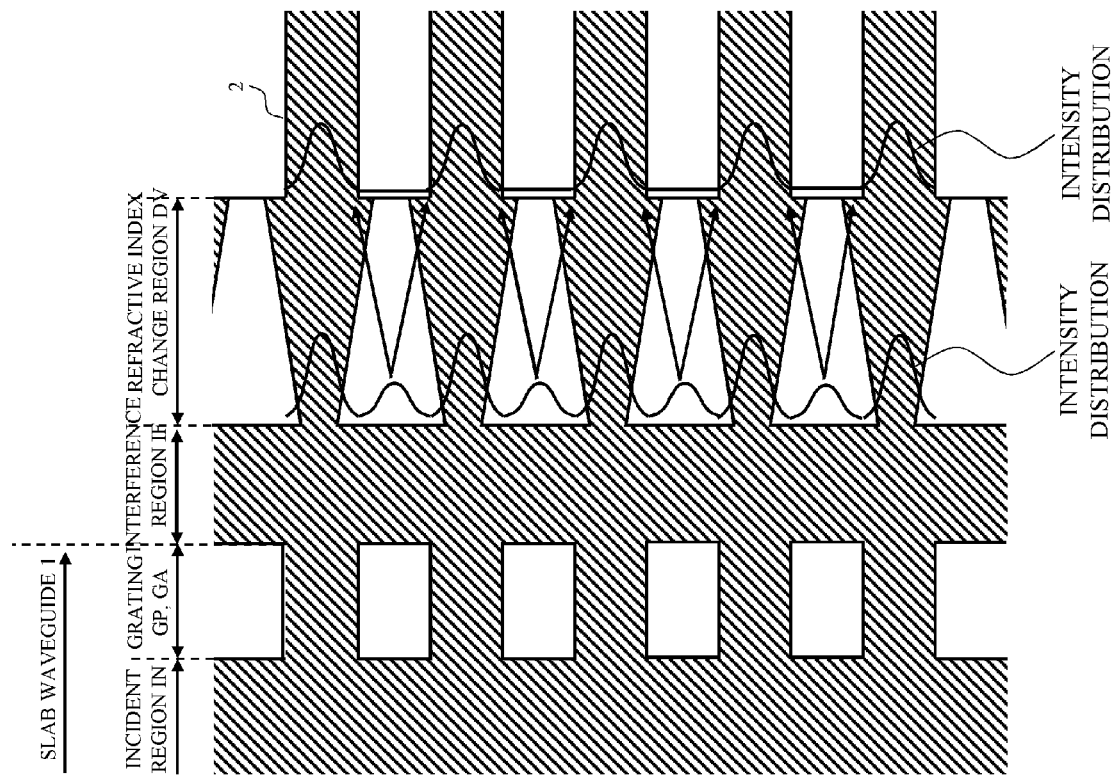

FIGS. 8A and 8B are views showing an effect of the refractive index change region. The optical waveguide is constituted of the slab waveguide 1, the arrayed waveguide 2, an interference region IF, and the refractive index change region DV. The slab waveguide 1 is constituted of an incident region IN and the grating GP or GA. The incident region IN and the grating GP or GA are substantially similar in the optical waveguide shown in FIGS. 8A and 8B and the optical waveguide shown in FIGS. 6A, 6B, 6C and 7. The interference region IF and the refractive index change region DV are formed between the slab waveguide 1 and the arrayed waveguide 2. In FIGS. 8A and 8B, the interference region IF is disposed on the slab waveguide 1 side, and the refractive index change region DV is disposed on the arrayed waveguide 2 side. However, the interference region IF may be disposed on the arrayed waveguide 2 side, and the refractive index change region DV may be disposed on the slab waveguide 1 side. Moreover, the interference region IF and the refractive index change region DV may be divided respectively, and may be alternately arranged in a direction substantially parallel to the light propagation direction. In the refractive index change region DV, an average value of the refractive index in a refractive index distribution in a direction substantially vertical to the light propagation direction is averagely increased from the slab waveguide 1 toward the arrayed waveguide 2. An average value of the refractive index in a refractive index distribution in a direction substantially parallel to the light propagation direction is increased at a central axis of the arrayed waveguide 2.

In the refractive index change region DV shown in FIGS. 8A and 8B, the refractive index of a region having a tapered shape and shown by diagonal lines is higher than the refractive index of a region having a tapered shape and shown by a white portion. The regions having a tapered shape and shown by diagonal lines and a white portion have substantially the same shape and are alternately arranged in a direction substantially vertical to the light propagation direction.

The width of the region having a tapered shape and shown by diagonal lines in the direction substantially vertical to the light propagation direction is increased from the slab waveguide 1 toward the arrayed waveguide 2. The width of the region having a tapered shape and shown by a white portion in a direction substantially vertical to the light propagation direction is reduced from the slab waveguide 1 toward the arrayed waveguide 2. Namely, the average value of the refractive index in the refractive index distribution in a direction substantially vertical to the light propagation direction is increased from the slab waveguide 1 toward the arrayed waveguide 2.

In the region having a tapered shape and shown by diagonal lines, the broader width side faces the arrayed waveguide 2 in the direction substantially parallel to the light propagation direction, and the narrower width side faces the interference region IF in the direction substantially parallel to the light propagation direction. In the region having a tapered shape and shown by a white portion, the broader width side faces the interference region IF in the direction substantially parallel to the light propagation direction, and the narrower width side faces the middle of the arrayed waveguides 2 adjacent to each other in the direction substantially vertical to the light propagation direction, in the direction substantially parallel to the light propagation direction. Namely, the average value of the refractive index in the refractive index distribution in a direction substantially parallel to the light propagation direction is increased from the middle of the arrayed waveguides 2 adjacent to each other in the direction substantially vertical to the light propagation direction toward the central axis of the arrayed waveguide 2.

FIG. 8A schematically shows intensity distribution of diffraction light having a specific design wavelength in which the structures and positions of the grating GP or GA and the interference region IF are optimized. Although light emitted from the interference region IF is localized on an extension of the arrayed waveguide 2, the light propagation mode width in the direction substantially vertical to the light propagation direction spreads across the full width of the arrayed waveguide 2 while the diffraction light propagates in the refractive index change region DV, and the emitted light propagates as a propagation mode in the arrayed waveguide 1.

FIG. 8B schematically shows intensity distribution of diffraction light having a wavelength shifted from the specific design wavelength in which the structures and positions of the grating GP or GA and the interference region IF are optimized. Although the light emitted from the interference region IF is substantially localized on the extension of the arrayed waveguide 2, a weak peak exists on the extension of the middle of the adjacent arrayed waveguides 2. As in FIG. 8A, the peak on the extension of the arrayed waveguide 2 spreads across the full width of the arrayed waveguide 2 while propagating in the refractive index change region DV, and propagates in the propagation mode of the arrayed waveguide 2. Accompanying this, the weak peak on the extension of the middle of the adjacent arrayed waveguides 2 is coupled to the peak on the extension of the arrayed waveguide 2, and propagates in the propagation mode of the arrayed waveguide 2, and the wavelength dependence of loss is reduced.

The refractive index change region DV shown in FIGS. 8A and 8B is constituted of a region having a high refractive index and a region having a low refractive index and has a discontinuous refractive index distribution. A more general refractive index change region DV may have a continuous refractive index distribution. Namely, in the more general refractive index change region DV, the refractive index may be continuously increased from the slab waveguide 1 toward the arrayed waveguide 2 in the direction substantially parallel to the light propagation direction, and the refractive index may be continuously increased toward the central axis of the arrayed waveguide 2 in the direction substantially vertical to the light propagation direction.

It may be designed so that a portion of or the whole interference region IF is included in the refractive index change region DV. FIGS. 9A, 9B, 9C, 9D, 10A and 10B are views showing various examples of the structure of the refractive index change region. In FIGS. 9A, 9B, 9C, 9D, 10A and 10B, a high refractive index region (diagonal lines) and a low refractive index region (white portion) extending in the direction substantially vertical to the light propagation direction in the refractive index change region DV correspond to a portion of the interference region IF. In FIGS. 8A and 8B, since interference occurs also in the refractive index change region DV, the interference region IF having a constant refractive index may be omitted in design. In FIGS. 9A, 9B, 9C, 9D, 10A and 10B, toward the arrayed waveguide 2 in the direction substantially parallel to the light propagation direction, although a portion entering from a region having a high refractive index to a region having a low refractive index locally exists, the refractive index is averagely increased.

Figure 9A:
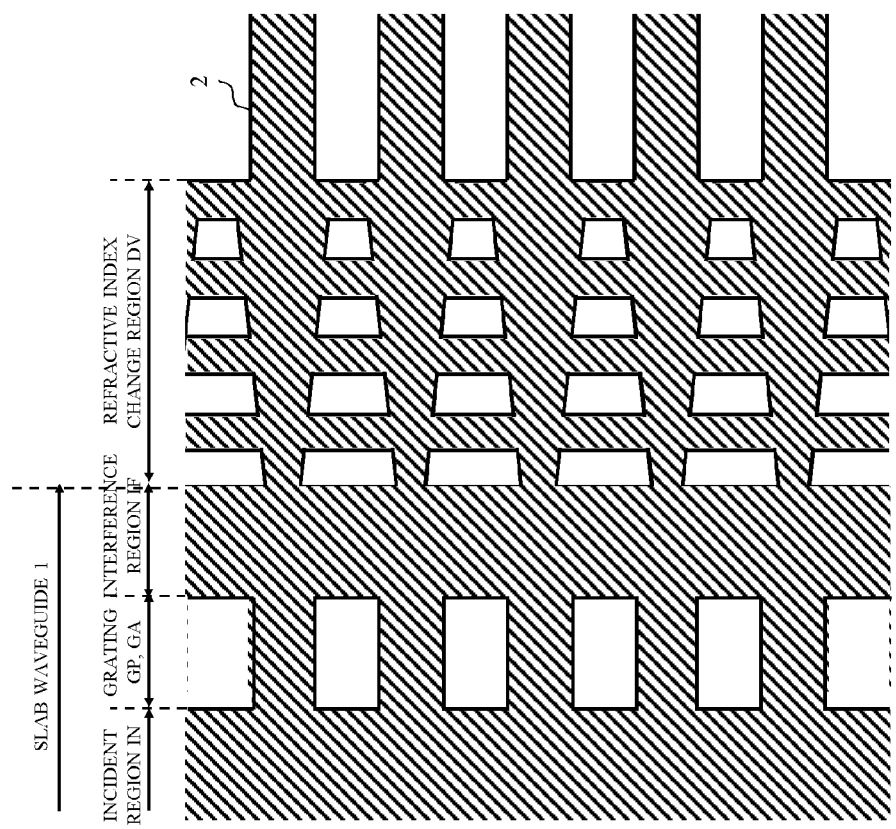

In the refractive index change region DV shown in FIG. 9A, although the low refractive index region having a tapered shape and shown by a white portion in FIGS. 8A and 8B is separated by a separation region having the same refractive index as the high refractive index region and extending in a direction substantially vertical to the light propagation direction, the separation region corresponds to a portion of the interference region IF.

Figure 9B:
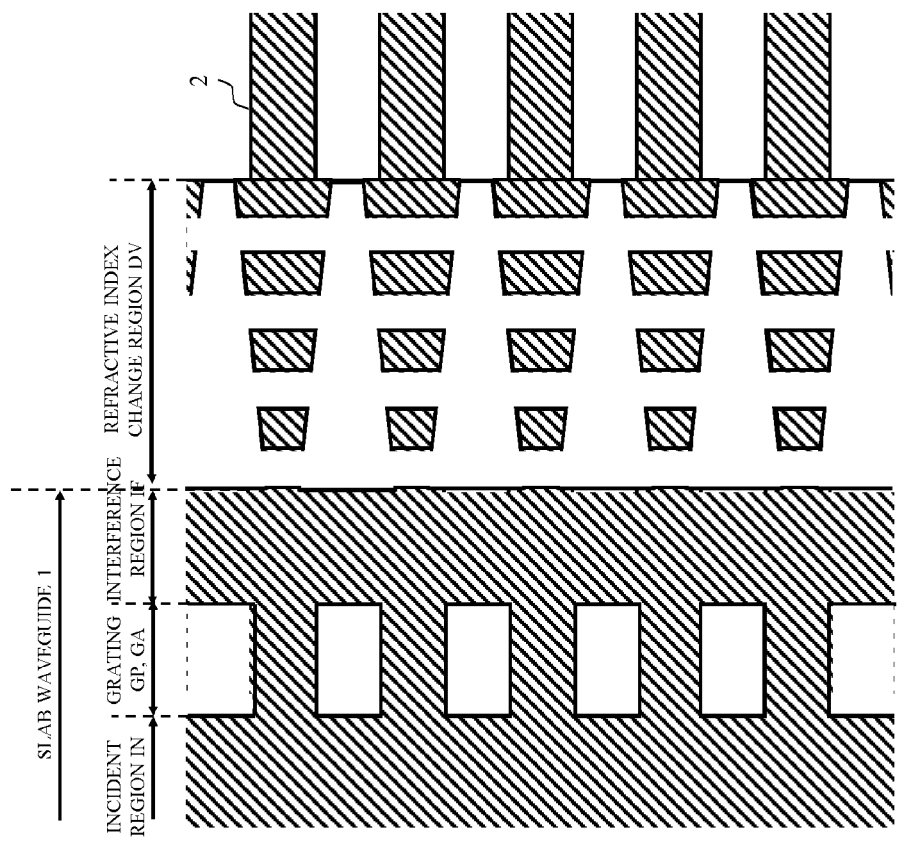

In the refractive index change region DV shown in FIG. 9B, although the high refractive index region having a tapered shape and shown by diagonal lines in FIGS. 8A and 8B is separated by a separation region having the same refractive index as the low refractive index region and extending in the direction substantially vertical to the light propagation direction, the separation region corresponds to a portion of the interference region IF.

The refractive index change region DV shown in FIG. 9C has a configuration including the configuration of the refractive index change region DV shown in FIGS. 9A and 9B. Namely, the low refractive index region having a tapered shape and shown by a white portion is separated by the high refractive index region, and the high refractive index region having a tapered shape and shown by diagonal lines is separated by the low refractive index region. The high refractive index region separating the low refractive index region having a tapered shape and shown by a white portion and the low refractive index region separating the high refractive index region having a tapered shape and shown by diagonal lines each correspond to a portion of the interference region IF.

Figure 9D:
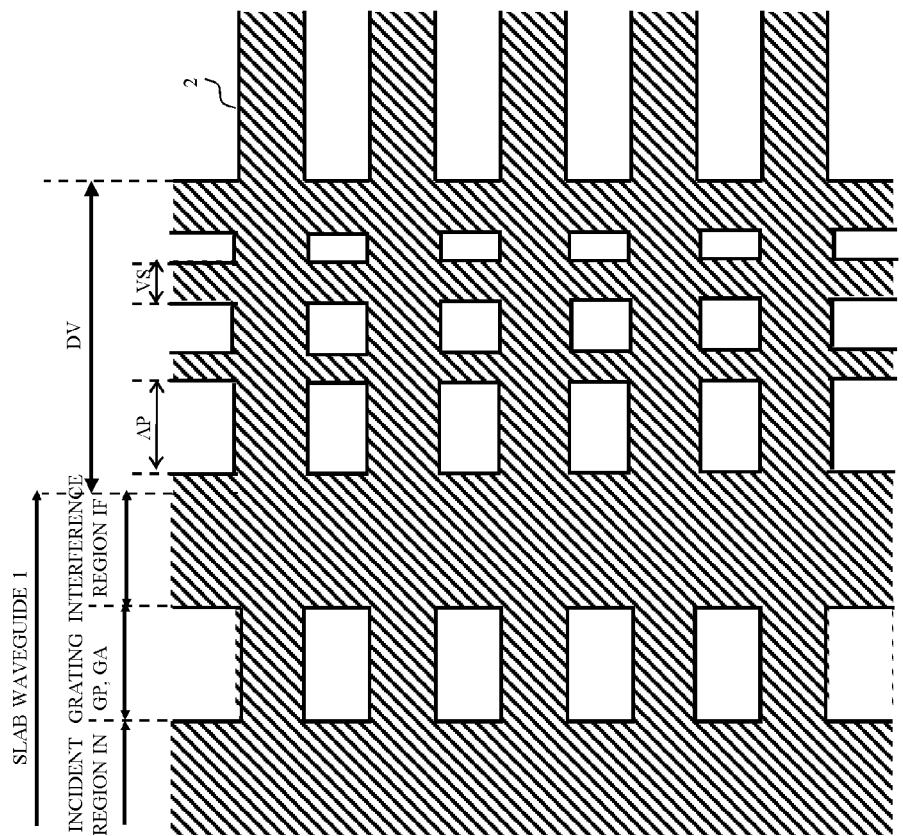

In the refractive index change region DV shown in FIG. 9D, alternative arrangement regions AP and vertically extending regions VS are alternately arranged in the direction substantially parallel to the light propagation direction. In the alternative arrangement regions AP, the high refractive index regions having a substantially rectangular shape and shown by diagonal lines and the low refractive index regions having a substantially rectangular shape and shown by a white portion are alternately arranged in the direction substantially vertical to the light propagation direction. The vertically extending region VS extends in the direction substantially vertical to the light propagation direction and has the same refractive index as the high refractive index region having a substantially rectangular shape and shown by diagonal lines. The alternative arrangement region AP closer to the arrayed waveguide 2 side of the alternative arrangement regions AP has a narrower width in the direction substantially parallel to the light propagation direction, and the vertically extending region VS closer to the arrayed waveguide 2 side of the vertically extending regions VS has a broader width in the direction substantially parallel to the light propagation direction.

The width of the alternative arrangement region AP and the width of the vertically extending region VS are not limited to the example shown in FIG. 9D. Namely, even when the width of the alternative arrangement region AP is constant or increases toward the arrayed waveguide 2, the width of the vertically extending region VS is increased toward the arrayed waveguide 2, whereby the refractive index may be averagely increased toward the arrayed waveguide 2. Alternatively, even when the width of the vertically extending region VS is constant or is reduced toward the arrayed waveguide 2, the width of the alternative arrangement region AP is reduced toward the arrayed waveguide 2, whereby the refractive index may be averagely increased toward the arrayed waveguide 2.

Figure 10A:
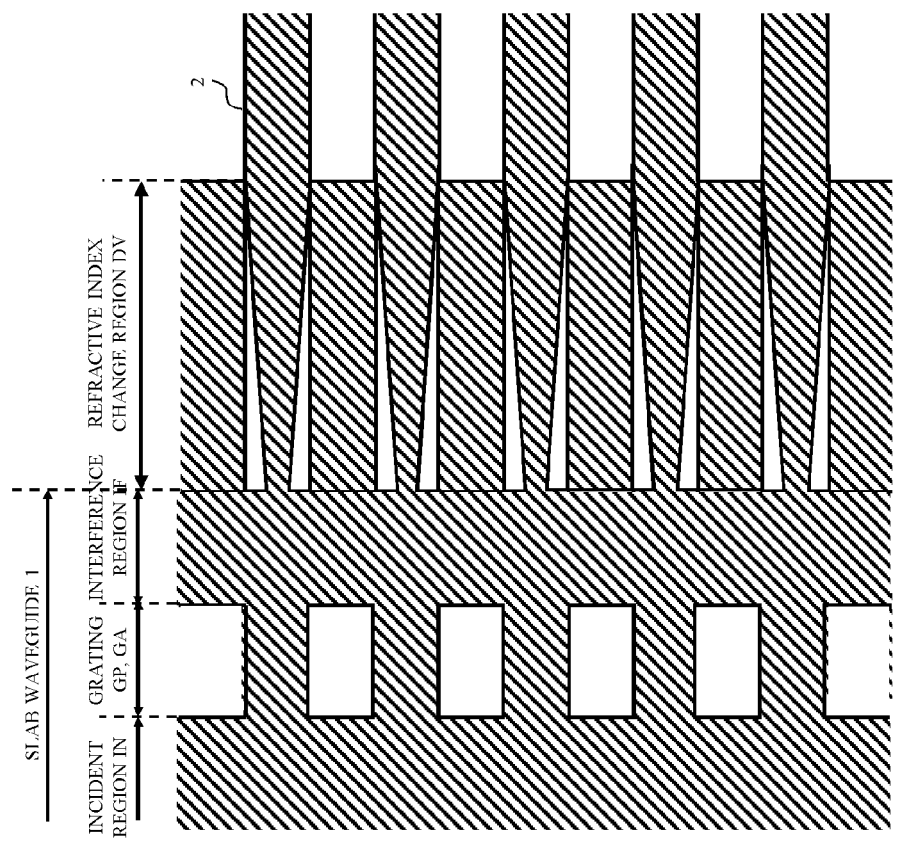
FIGS. 10A and 10B are views showing various examples of the structure of the refractive index change region.

In the refractive index change region DV shown in FIG. 10A, a low refractive index region having a tapered shape and shown by a white portion in FIGS. 8A and 8B constitutes two parallel divided regions divided in the direction substantially parallel to the light propagation direction. The two parallel divided regions are arranged at a distance from each other in the direction substantially vertical to the light propagation direction. A parallel inter-divisional region having the same refractive index as the high refractive index region having a tapered shape and shown by diagonal lines is disposed between the two parallel divided regions.

Figure 10B:
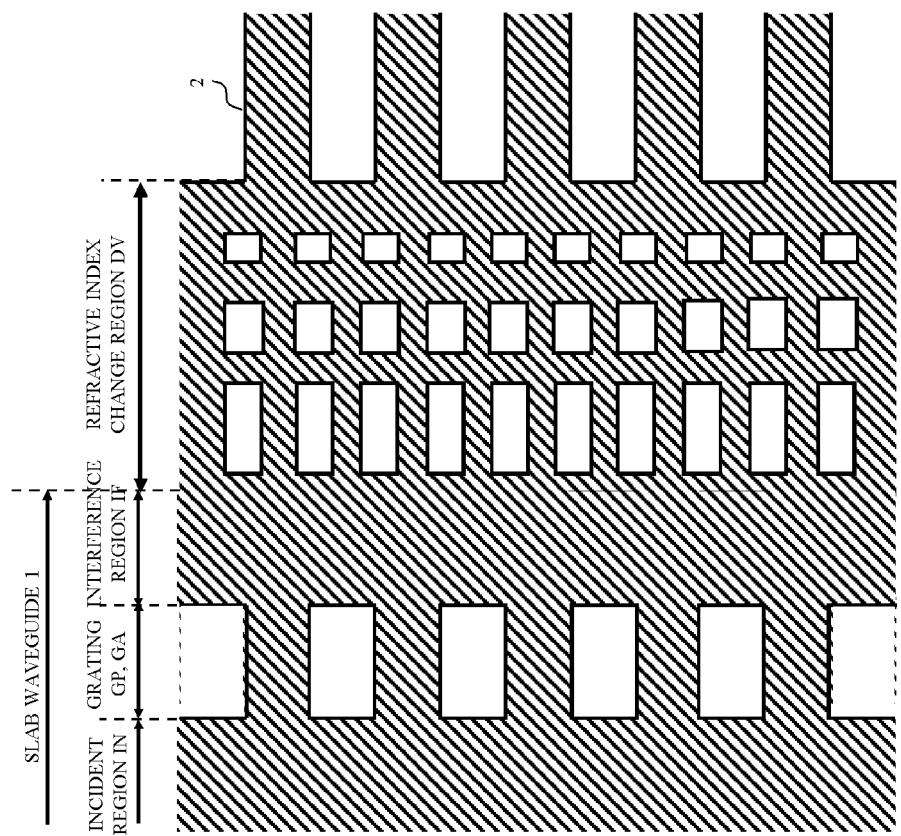

In the refractive index change region DV shown in FIG. 10B, a low refractive index region having a substantially rectangular shape and shown by a white portion in FIG. 9D constitutes two parallel divided regions divided in the direction substantially parallel to the light propagation direction. The two parallel divided regions are arranged at a distance from each other in the direction substantially vertical to the light propagation direction. A parallel inter-divisional region having the same refractive index as the high refractive index region having a substantially rectangular shape and shown by diagonal lines is disposed between the two parallel divided regions.

Figure 11A:
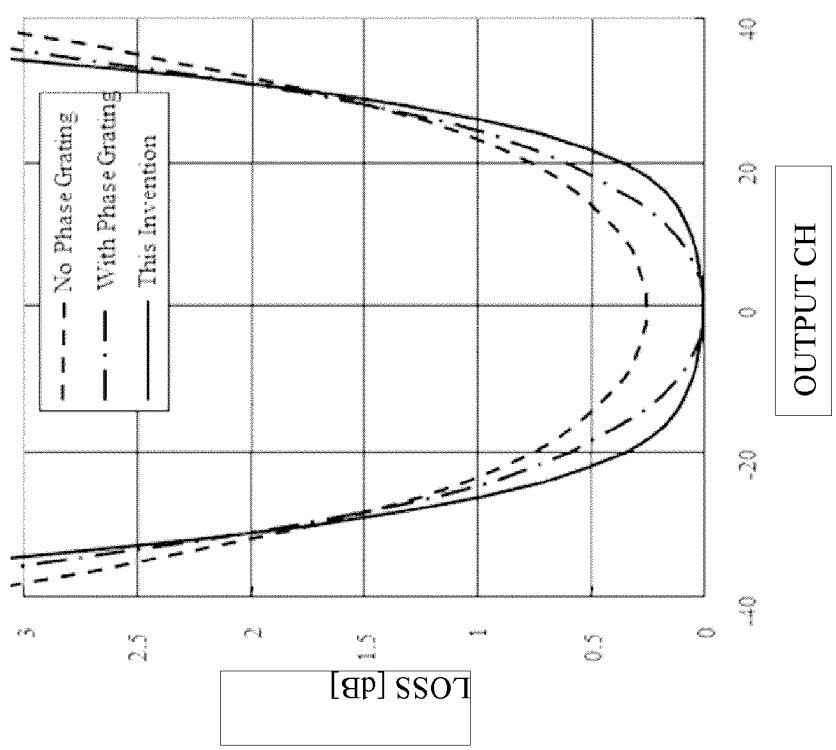
FIGS. 11A, 11B and 11C are views showing calculation results and experimental results of insertion loss.
Figure 11B:
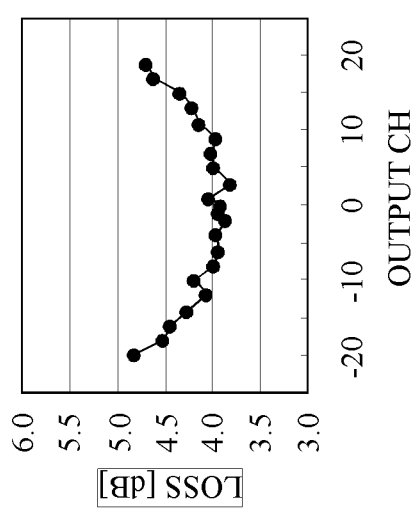
Figure 11C:
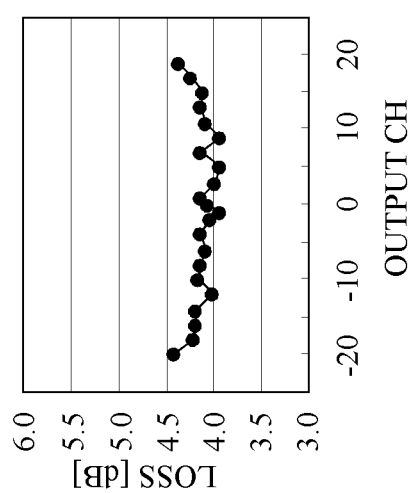

FIGS. 11A, 11B and 11C are views showing calculation results and experimental results of insertion loss. The optical waveguide in FIGS. 11A, 11B and 11C has the phase grating GP1 and the interference region IF shown in FIGS. 6A and 6B and the refractive index change region DV shown in FIG. 9B. Here, the phase difference given to incident light by the phase grating GP1 is $\pi/4$. As to the refractive index change region DV, in a high refractive index region having a tapered shape and shown by diagonal lines, the width of the broader width side in the direction substantially vertical to the light propagation direction is 7.0 μm, and the width of the narrower width side in the direction substantially vertical to the light propagation direction is 5.0 μm. The width of any of the vertical divided regions having a low refractive index and shown by a white portion in the direction substantially parallel to the light propagation direction is 3.0 μm, and the width of any of the vertical divided regions having a high refractive index and shown by diagonal lines in the direction substantially parallel to the light propagation direction is 4.5 μm. Meanwhile, each width of the interference region IF and the refractive index change region DV in the light propagation direction is 47 μm.

In the calculation results of insertion loss shown in FIG. 11A, an output channel number in the center arrayed waveguide 2 is 0, and the output channel number in the arrayed waveguide 2 at the both edges of the plurality of arrayed waveguides 2 is ±40, and the horizontal axis and the vertical axis represent the output channel number and the insertion loss, respectively. In the experimental results of the insertion loss shown in FIGS. 11B and 11C, the output channel number in the center arrayed waveguide 2 is 0, and the output channel number in the arrayed waveguide 2 at the both edges of the plurality of arrayed waveguides 2 is ±20, and the horizontal axis and the vertical axis represent the output channel number and the insertion loss, respectively.

In the calculation results of insertion loss shown in FIG. 11A, a broken line represents the calculation results in the prior art in which the grating GP or GA and the refractive index change region DV are not formed, an alternate long and short dashed line represents the calculation results in a comparative example in which the grating GP or GA is formed and the refractive index change region DV is not formed, and a solid line represents the calculation results in this disclosure in which the grating GP or GA and the refractive index change region DV are formed. FIGS. 11B and 11C show the experimental results of the insertion loss in the comparative example and this disclosure, respectively.

As seen in the calculation results and experimental results of the insertion loss, as compared with the prior art and the comparative example, in this disclosure, the insertion loss can be reduced around the center arrayed waveguide 2, and, at the same time, the insertion loss can be substantially uniformed regardless of the position of formation of the arrayed waveguide 2.

Embodiment 4

In the embodiment 4, a method of manufacturing an optical waveguide will be described. The method of manufacturing an optical waveguide shown in FIGS. 6A, 6B, 6C, 7, 8A, 8B, 9A, 9B, 9C, 9D, 10A and 10B includes a method using lithography and etching and a method using ultraviolet irradiation.

In the method using lithography and etching, first, $SiO_2$ fine particles becoming a lower clad layer and $SiO_2$—$GeO_2$ fine particles becoming a core layer are deposited on a Si substrate by a flame hydrolysis deposition method and heated and melted to be transparent. Next, an unnecessary portion of the core layer is removed by lithography and etching, and an optical circuit pattern is formed. At the same time, an unnecessary portion of the core layer is removed from a portion becoming the low refractive index region. Finally, the $SiO_2$ fine particles becoming an upper clad layer are deposited by the flame hydrolysis deposition method and heated and melted to be transparent, whereby when the upper clad layer is formed, the portion becoming the low refractive index region is filled with a clad material.

While the core is not completely removed when being etched and the area dependence of the etching rate is used, the height of the remaining core in the low refractive index region (white portion) in the refractive index change region DV of FIGS. 8A, 8B, 9A, 9B, 9C, 9D, 10A and 10B is increased toward the arrayed waveguide 2, whereby the average value of the refractive index can be increased toward the arrayed waveguide 2.

In the above case, although the low refractive index region is formed by the formation process of the slab waveguide 1 and the arrayed waveguide 2, after the formation of the slab waveguide 1 and the arrayed waveguide 2, the portion becoming the low refractive index region may be grooved and filled with resin and so on having a refractive index different from the refractive index of the core layer, or the low refractive index region may be formed with an air space by only grooving.

The method using ultraviolet irradiation utilizes the phenomenon that the refractive index is increased by ultraviolet irradiation. After the formation of the lower clad layer and the core layer, or after the formation of the lower clad layer, the core layer, and the upper clad layer, a mask material is formed on the portion becoming the low refractive index region, and the refractive indices of portions other than the portion becoming the low refractive index region are changed by ultraviolet irradiation, whereby the low refractive index region is formed.

The interference region IF may be provided with any material as long as it has a function of interfering light. For example, the interference region IF may be provided with at least one of materials including a core material, a clad material, $SiO_2$—$GeO_2$ irradiated with ultraviolet light, resin, and air.

When the amplitude grating GA is formed instead of the phase grating GP, the portion becoming the region shown by a white portion of FIGS. 6A, 6B, 6C, 7, 8A, 8B, 9A, 9B, 9C, 9D, 10A and 10B is filled with a light-shielding material excellent in light absorption. As the light-shielding material, a silicone resin, an epoxy resin, or the like mixed with carbon black and metal fine particles is used.

Embodiment 5

In the embodiment 5, an arrayed waveguide grating provided with the optical waveguide described in the embodiments 1 to 4 will be described. In the arrayed waveguide grating, one or more first input/output waveguides, a first slab waveguide, a plurality of arrayed waveguides, a second slab waveguide, and one or more second input/output waveguides are connected in this order. The first slab waveguide and the plurality of arrayed waveguides constitute the optical waveguide described in the embodiments 1 to 4, serving as a slab waveguide 1 and an arrayed waveguide 2, respectively.

Although light with a plurality of wavelengths propagates in the first slab waveguide, an arbitrary wavelength of the plurality of wavelengths is selected as $\lambda$ in FIGS. 1 and 2. The arbitrary wavelength is a center wavelength of the plurality of wavelengths, for example. When the arbitrary wavelength is applied, the designing method described in the embodiments 2 and 3 and the manufacturing method described in the embodiment 4 are applied.

The grating may be disposed in not only the first slab waveguide but also the second slab waveguide. The grating may be disposed in only the first slab waveguide, and the transition region of the Patent Documents 1 to 4 or the slope portion of the Patent Document 5 may be disposed in the second slab waveguide.

An optical waveguide and an arrayed waveguide grating according to the present disclosure can be utilized in low loss optical fiber communication utilizing wavelength division multiplexing system.

EXPLANATION OF REFERENCE SIGNS

1: Slab waveguide
2: Arrayed waveguide
GP: Phase grating
GA: Amplitude grating
SP, SA: Self-image
IN: Incident region
IF: Interference region
DV: Refractive index change region
AP: Alternative arrangement region
VS: Vertically extending region

The invention claimed is:

1. An optical waveguide comprising:
   a slab waveguide in which a grating is formed;
   an arrayed waveguide connected to a position where a constructive interference portion of a self-image of the grating is formed; and
   a refractive index change region formed between the slab waveguide and the arrayed waveguide, in which an average value of the refractive index in a refractive index distribution in a direction substantially vertical to a light propagation direction is averagely increased from the slab waveguide toward the arrayed waveguide, and in which an average value of the refractive index in a refractive index distribution in a direction substantially parallel to the light propagation direction is increased at a central axis of the arrayed waveguide.

2. The optical waveguide according to claim 1, wherein the refractive index change region comprises:
   a high refractive index region which has a tapered shape in which the width in the direction substantially vertical to the light propagation direction is increased from the slab waveguide toward the arrayed waveguide, and in which the broader width side of the tapered shape faces the arrayed waveguide in the direction substantially parallel to the light propagation direction, and in which the narrower width side of the tapered shape faces the slab waveguide in the direction substantially parallel to the light propagation direction; and a low refractive index region which has a refractive index lower than that of the high refractive index region and has a tapered shape in which the width in the direction substantially vertical to the light propagation direction is reduced from the slab waveguide toward the arrayed waveguide, and in which the broader width side of the tapered shape faces the slab waveguide in the direction substantially parallel to the light propagation direction, and in which the narrower width side of the tapered shape faces the middle of the arrayed waveguides adjacent to each other in the direction substantially vertical to the light propagation direction, in the direction substantially parallel to the light propagation direction.

3. The optical waveguide according to claim 2, wherein the low refractive index region is separated by a region having the same refractive index as the high refractive index region and extending in the direction substantially vertical to the light propagation direction, or the high refractive index region is separated by a region having the same refractive index as the low refractive index region and extending in the direction substantially vertical to the light propagation direction.

4. The optical waveguide according to claim 1, wherein in the refractive index change region, a plurality of alternative arrangement regions in which a high refractive index region and a low refractive index region having a refractive index lower than that of the high refractive index region are alternatively arranged in the direction substantially vertical to the light propagation direction; and a plurality of vertically extending regions extending in the direction substantially vertical to the light propagation direction and having the same refractive index as the high refractive index region, are alternatively arranged in the direction substantially parallel to the light propagation direction, and the alternative arrangement region closer to the arrayed waveguide side of the plurality of alternative arrangement regions has a narrower width in the direction substantially parallel to the light propagation direction, or the vertically extending region closer to the arrayed waveguide side of the plurality of vertically extending regions has a broader width in the direction substantially parallel to the light propagation direction.

5. The optical waveguide according to claim 2, wherein the low refractive index region constitutes two parallel divided regions divided in the direction substantially parallel to the light propagation direction, the two parallel divided regions are arranged at a distance from each other in the direction substantially vertical to the light propagation direction, and a parallel inter-divisional region having the same refractive index as the high refractive index region is disposed between the two parallel divided regions.

6. The optical waveguide according to claim 1, wherein the grating is a phase grating.

7. The optical waveguide according to claim 6, wherein a phase difference given to incident light by the phase grating is approximately 90 degrees.

8. The optical waveguide according to claim 6, wherein a phase difference given to incident light by the phase grating is approximately 180 degrees.

9. The optical waveguide according to claim 4, wherein the low refractive index region constitutes two parallel divided regions divided in the direction substantially parallel to the light propagation direction, the two parallel divided regions are arranged at a distance from each other in the direction substantially vertical to the light propagation direction, and a parallel inter-divisional region having the same refractive index as the high refractive index region is disposed between the two parallel divided regions.

10. An arrayed waveguide grating comprising:
one or more first input/output waveguides;
the optical waveguide according to claim 1 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

11. An arrayed waveguide grating comprising:
one or more first input/output waveguides;
the optical waveguide according to claim 2 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

12. An arrayed waveguide grating comprising:
one or more first input/output waveguides;
the optical waveguide according to claim 3 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

13. An arrayed waveguide grating comprising:
one or more first input/output waveguides;
the optical waveguide according to claim 4 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

14. An arrayed waveguide grating comprising:
one or more first input/output waveguides;
the optical waveguide according to claim 5 whose end of the slab waveguide on the opposite side of the arrayed waveguide is connected to an end of the first input/output waveguide;
a second slab waveguide connected to an end of the arrayed waveguide on the opposite side of the slab waveguide; and one or more second input/output waveguides connected to an end of the second slab waveguide on the opposite side of the arrayed waveguide.

15. An arrayed waveguide grating comprising:
one or more first input/output waveguides;
the optical waveguide according to claim 6 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

16. An arrayed waveguide grating comprising:
one or more first input/output waveguides;
the optical waveguide according to claim 7 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

17. An arrayed waveguide grating comprising:
one or more first input/output waveguides;
the optical waveguide according to claim 8 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

18. An arrayed waveguide grating comprising:
one or more first input/output waveguides;
the optical waveguide according to claim 9 whose end of the slab waveguide on the opposite side of the arrayed waveguide is connected to an end of the first input/output waveguide;
a second slab waveguide connected to an end of the arrayed waveguide on the opposite side of the slab waveguide; and
one or more second input/output waveguides connected to an end of the second slab waveguide on the opposite side of the arrayed waveguide.

* * * * *